(12) United States Patent
Zhou et al.

(10) Patent No.: US 10,903,755 B2
(45) Date of Patent: Jan. 26, 2021

(54) POWER CONVERSION DEVICE

(71) Applicant: DAIKIN INDUSTRIES, LTD., Osaka (JP)

(72) Inventors: Yueqiang Zhou, Osaka (JP); Reiji Kawashima, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 16/760,741

(22) PCT Filed: Oct. 30, 2018

(86) PCT No.: PCT/JP2018/040402
§ 371 (c)(1),
(2) Date: Apr. 30, 2020

(87) PCT Pub. No.: WO2019/088131
PCT Pub. Date: May 9, 2019

(65) Prior Publication Data
US 2020/0343827 A1  Oct. 29, 2020

(30) Foreign Application Priority Data

Oct. 30, 2017 (JP) ................................ 2017-209194

(51) Int. Cl.
*H02M 7/48* (2007.01)
(52) U.S. Cl.
CPC ..................................... *H02M 7/48* (2013.01)
(58) Field of Classification Search
None
See application file for complete search history.

(56) References Cited

U.S. PATENT DOCUMENTS 9,919,610 B1 *  3/2018  Sarwat ................... H02M 5/275
2009/0237961 A1   9/2009  Sakakibara et al.
(Continued)

FOREIGN PATENT DOCUMENTS

JP        2008-29151 A      2/2008

OTHER PUBLICATIONS

International Search Report of corresponding PCT Application No. PCT/JP2018/040402 dated Jan. 8, 2019.
(Continued)

*Primary Examiner* — Jeffrey A Gblende
(74) *Attorney, Agent, or Firm* — Global IP Counselors, LLP

(57) ABSTRACT

A power conversion device includes a power conversion unit that converts power into AC power having a predetermined frequency and voltage through a switching operation of a plurality of switching elements, a DC unit including a capacitor and a reactor, and a controller that controls the switching operation. The capacitor smooths a ripple caused by the switching operation in the power conversion unit. The controller monitors an indicator value correlated with a disturbance that distorts an input current supplied to the power conversion unit, and compensates a manipulated variable of control of the switching operation in the power conversion unit in accordance with at least a frequency component closest to a resonant frequency of the DC unit among a plurality of frequency components. The frequency components are included in variations in the indicator value and correspond to integral multiples of a power source frequency of an AC power source.

18 Claims, 22 Drawing Sheets

(56) References Cited

U.S. PATENT DOCUMENTS

| | | | | |
|---|---|---|---|---|
| 2014/0334190 A1* | 11/2014 | Zhang | ............... | H02M 3/33507 |
| | | | | 363/17 |
| 2015/0256095 A1* | 9/2015 | Ohta | ....................... | H02P 21/05 |
| | | | | 363/37 |
| 2016/0359423 A1* | 12/2016 | Ohta | ....................... | H02M 1/12 |

OTHER PUBLICATIONS

International Preliminary Report of corresponding PCT Application No. PCT/JP2018/040402 dated May 14, 2020.

* cited by examiner

POWER CONVERSION DEVICE

CROSS-REFERENCE TO RELATED APPLICATIONS

This U.S. National stage application claims priority under 35 U.S.C. § 119(a) to Japanese Patent Application No. 2017-209194, filed in Japan on Oct. 30, 2017, the entire contents of which are hereby incorporated herein by reference.

BACKGROUND

Field of the Invention

The present disclosure relates to a power conversion device.

Background Information

Hitherto, there has been known a power conversion device that converts power supplied from an alternating-current (AC) power source into AC power having a predetermined frequency and voltage. For example, Japanese Unexamined Patent Application Publication No. 2008-29151 discloses an inverter device including a diode bridge that converts an input three-phase AC voltage into a direct-current (DC) voltage, an inverter unit that converts the DC voltage obtained through the conversion by the diode bridge into an AC voltage and outputs the AC voltage, and an LC filter including a reactor connected between the diode bridge and the inverter unit and a capacitor connected between input terminals of the inverter unit. In the inverter device according to PTL 1, the capacitance of the capacitor is 1/100 or less of the conventional one. The inverter device according to Japanese Unexamined Patent Application Publication No. 2008-29151 constitutes a so-called electrolytic capacitorless inverter.

In the power conversion device as described above (in particular, an electrolytic capacitorless inverter), a disturbance of a repeating waveform such as a resonance phenomenon in an LC resonant circuit including a capacitor and a reactor (LC resonance) occurs, and the disturbance may cause distortion of an input current (a current supplied to the inverter unit). Thus, in the power conversion device according to Japanese Unexamined Patent Application Publication No. 2008-29151. to suppress distortion of an input current, the inverter unit is controlled on the basis of the voltage across the reactor such that the transmission characteristic of input and output voltages of the inverter unit becomes a characteristic close to a first-order lag system.

SUMMARY

In the power conversion device according to Japanese Unexamined Patent Application Publication No. 2008-29151, an operation of compensating a manipulated variable of control of a switching operation in the inverter unit (power conversion unit) is performed on the basis of the voltage across the reactor. However, in the power conversion device according to Japanese Unexamined Patent Application Publication No. 2008-29151, the manipulated variable is compensated by proportional control that is based on the voltage across the reactor, and an offset occurs in the proportional control. Because of the offset, a portion in which a distortion of a waveform is not sufficiently reduced may remain in an input current (a current supplied to the power conversion unit). Thus, it is difficult to sufficiently reduce the distortion of the input current.

Accordingly, it is an object of the present disclosure to provide a power conversion device capable of sufficiently reducing a distortion of an input current.

A first aspect of the present disclosure relates to a power conversion device. The power conversion device includes a power conversion unit (13) that converts AC power output from an AC power source (20) or DC power obtained by converting the AC power, into AC power having a predetermined frequency and voltage through a switching operation of a plurality of switching elements; a DC unit (12) that includes a capacitor (12a) and a reactor (12b), the capacitor (12a) smoothing a ripple caused by the switching operation in the power conversion unit (13); and a controller (50) that controls the switching operation in the power conversion unit (13). The controller (50) monitors an indicator value correlated with a disturbance that distorts an input current (idc) supplied to the power conversion unit (13), and compensates a manipulated variable of control of the switching operation in the power conversion unit (13) in accordance with at least a frequency component closest to a resonant frequency (fLC) of the DC unit (12) among a plurality of frequency components that are included in variations in the indicator value and that correspond to integral multiples of a power source frequency (fp) of the AC power source (20).

In the first aspect, the plurality of frequency components corresponding to the integral multiples of the power source frequency (fp) of the AC power source (20) cause a disturbance that distorts the input current (idc). In addition, among the plurality of frequency components corresponding to integral multiples of the power source frequency (fp) of the AC power source (20), the frequency component closest to the resonant frequency (fLC) of the DC unit (12) tends to be relatively large. Thus, as a result of compensating, the manipulated variable of control of the switching operation in the power conversion unit (13) in accordance with at least the frequency component closest to the resonant frequency (fLC) of the DC unit (12) among the plurality of frequency components that are included in variations in the indicator value and that correspond to the integral multiples of the power source frequency (fp) of the AC power source (20), it is possible to reduce the frequency component causing a disturbance that distorts the input current (idc) (in particular, the frequency component closest to the resonant frequency (fLC) of the DC unit (12) among the plurality of frequency components corresponding to the integral multiples of the power source frequency (fp) of the AC power source (20)).

A second aspect of the present disclosure relates to the first aspect. In the second aspect, the controller (50) includes a first storage processing unit (200) that computes and stores, for each of storage phase angles (θs) predetermined in a storage period (Ps) that is based on a power source period (Pin) of the AC power source (20), an integral of the indicator value at the storage phase angle (θs), and a switching control unit (70) that is configured to control the switching operation in the power conversion unit (13) and that compensates the manipulated variable of control of the switching operation in the power conversion unit (13) on the basis of the integral of the indicator value stored for each of the storage phase angles (θs) in the first storage processing unit (200).

In the second aspect, as a result of performing an operation of compensating the manipulated variable of control of the switching operation in the power conversion unit (13) on the basis of the integral of the indicator value stored for each storage phase angle (θs) (i.e., integral control), a deviation between the input current (idc) and an ideal value of the input current (idc) can be made close to zero for each storage phase angle ($\theta$s). Accordingly, the frequency component causing a disturbance that distorts the input current can be reduced.

A third aspect of the present disclosure relates to the second aspect. In the third aspect, the first storage processing unit (200) adds an indicator value acquired at the storage phase angle ($\theta$s) and a value acquired by multiplying the integral of the indicator value at the storage phase angle ($\theta$s) stored in the first storage processing unit (200) by a positive coefficient smaller than 1, and updates the integral of the indicator value at the storage phase angle ($\theta$s) stored in the first storage processing unit (200) to a value acquired through the addition, In the third aspect, the integral of the indicator value stored for each storage phase angle ($\theta$s) can be updated such that variation in the integral of the indicator value with respect to variation in the indicator value stored for each storage phase angle ($\theta$s) becomes small (i.e., such that the integral of the indicator value is quickly stabilized), A fourth aspect of the present disclosure relates to the first aspect. In the fourth aspect, the controller (50) includes an adding unit (501), a delaying unit (502), and a switching control unit (70). The adding unit (501) adds the indicator value input thereto and an output of the delaying unit (502). The delaying unit (502) delays an output of the adding unit (501) by a delay time corresponding to an integral submultiple of a power source period (Pin) of the AC power source (20). The switching control unit (70) is configured to control the switching operation in the power conversion unit (13) and compensates the manipulated variable of control of the switching operation in the power conversion unit (13) on the basis of the output of the adding unit (501).

In the fourth aspect, as a result of adding the indicator value input to the adding unit (501) and the output of the delaying unit (502), it is possible to perform an operation of compensating the manipulated variable of control of the switching operation in the power conversion unit (13) on the basis of the integral of the indicator value (i.e., integral control). Accordingly, a deviation between the input current (idc) and an ideal value of the input current (idc) can be made close to zero, and thus the frequency component causing a disturbance that distorts the input current can be reduced.

A fifth aspect of the present disclosure relates to the first aspect. In the fifth aspect, the controller (50) includes a frequency component extracting unit (601) that extracts at least the frequency component closest to the resonant frequency (fLC) of the DC unit (12) among the plurality of frequency components that are included in the variations in the indicator value and that correspond to the integral multiples of the power source frequency (fp) of the AC power source (20), and a switching control unit (70) that is configured to control the switching operation in the power conversion unit (13) and that compensates the manipulated variable of control of the switching operation in the power conversion unit (13) on the basis of the frequency component extracted by the frequency component extracting unit (601).

In the fifth aspect, as a result of compensating the manipulated variable of control of the switching operation in the power conversion unit (13) on the basis of the frequency component extracted by the frequency component extracting unit (601), it is possible to reduce the frequency component causing a disturbance that distorts the input current (idc) (in particular, the frequency component closest to the resonant frequency (fLC) of the DC unit (12) among the plurality of frequency components corresponding to the integral multiples of the power source frequency (fp) of the AC power source (20)).

A sixth aspect of the present disclosure relates to the first aspect. In the sixth aspect, the controller (50) includes a Fourier operation processing unit (701) that performs Fourier transform on the indicator value to acquire an operation result about at least the frequency component closest to the resonant frequency (fLC) of the DC unit (12) among the plurality of frequency components that are included in the variations in the indicator value and that correspond to the integral multiples of the power source frequency (fp) of the AC power source (20), and a switching control unit (70) that is configured to control the switching operation in the power conversion unit (13) and that compensates the manipulated variable of control of the switching operation in the power conversion unit (13) on the basis of the operation result acquired by the Fourier operation processing unit (701).

In the sixth aspect, as a result of compensating the manipulated variable of control of the switching operation in the power conversion unit (13) on the basis of the operation result acquired by the Fourier operation processing unit (701), it is possible to reduce the frequency component causing a disturbance that distorts the input current (idc) (in particular, the frequency component closest to the resonant frequency (fLC) of the DC unit (12) among the plurality of frequency components corresponding to the integral multiples of the power source frequency (fp) of the AC power source (20)).

A seventh aspect of the present disclosure relates to any one of the second to sixth aspects. In the seventh aspect, the switching control unit (70) includes a compensation amount computing unit (80a) that derives a compensation amount (rc*) that is based on at least the frequency component closest to the resonant frequency (fLC) of the DC unit (12) among the plurality of frequency components that are included in the variations in the indicator value and that correspond to the integral multiples of the power source frequency (fp) of the AC power source (20), a multiplying unit (801) that multiplies the compensation amount (rc*) derived by the compensation amount computing unit (80a) by a predetermined multiplication coefficient, an adjusting unit (802) that adjusts the multiplication coefficient for the multiplying unit (801) such that an output of the multiplying unit (801) is within a predetermined allowable range, and a compensation processing unit (84) that compensates the manipulated variable of control of the switching operation in the power conversion unit (13) on the basis of the output of the multiplying unit (801).

In the seventh aspect, as a result of adjusting the multiplication coefficient for the multiplying unit (801) such that the output of the multiplying unit (801) (the compensation amount acquired by multiplying the compensation amount (rc*) derived by the compensation amount computing unit (80a) by the multiplication coefficient) is within the allowable range, it is possible to prevent the influence of the output of the multiplying unit (801) with respect to the manipulated variable of control of the switching operation in the power conversion unit (13) from becoming too large.

An eighth aspect of the present disclosure relates to any one of the first to seventh aspects. In the eighth aspect, the indicator value is any one of a reactor voltage (VL) which is a voltage across the reactor (12b), a deviation between the reactor voltage (VL) and a command value of the reactor voltage (VL), a deviation between the input current (idc) and a command value of the input current (idc), a deviation between a DC voltage (Vdc) which is a voltage across the capacitor (12a) and a command value of the DC voltage (Vdc), and a deviation between an energy of the capacitor (12a) and a command value of the energy of the capacitor (12a).

According to the present disclosure, the frequency component causing a disturbance that distorts the input current (idc) (in particular, the frequency component closest to the resonant frequency (fLC) of the DC unit (12) among the plurality of frequency components corresponding to the integral multiples of the power source frequency (fp) of the AC power source (20)) can be reduced, and thus a distortion of the input current (idc) can be sufficiently reduced.

According to the second aspect of the present disclosure, a deviation between the input current (idc) and an ideal value of the input current (idc) can be made close to zero for each storage phase angle (θs). Accordingly, the frequency component causing a disturbance that distorts the input current can be reduced. As a result, a distortion of the input current (idc) can be sufficiently reduced.

According to the third aspect of the present disclosure, the integral of the indicator value stored for each storage phase angle (θs) can be updated such that variation in the integral of the indicator value with respect to variation in the indicator value stored for each storage phase angle (θs) becomes small (i.e., such that the integral of the indicator value is quickly stabilized), and thus the stability of the compensation operation performed in the switching control unit (70) (i.e., an operation of compensating the manipulated variable of control of the switching operation in the power conversion unit (13)) can be improved.

According to the fourth aspect of the present disclosure, a deviation between the input current (idc) and an ideal value of the input current (idc) can be made close to zero, and thus the frequency component causing a disturbance that distorts the input current can be reduced. As a result, a distortion of the input current (idc) can be sufficiently reduced.

According to the fifth aspect of the present disclosure, the frequency component causing a disturbance that distorts the input current (idc) (in particular, the frequency component closest to the resonant frequency (fLC) of the DC unit (12) among the plurality of frequency components corresponding to the integral multiples of the power source frequency (fp) of the AC power source (20)) can be reduced, and thus a distortion of the input current (idc) can be sufficiently reduced.

According to the sixth aspect of the present disclosure, the frequency component causing a disturbance that distorts the input current (idc) (in particular, the frequency component closest to the resonant frequency (fLC) of the DC unit (12) among the plurality of frequency components corresponding to the integral multiples of the power source frequency (fp) of the AC power source (20)) can be reduced, and thus a distortion of the input current (idc) can be sufficiently reduced.

According to the seventh aspect of the present disclosure, the influence of the output of the multiplying unit (801) with respect to the manipulated variable of control of the switching operation in the power conversion unit (13) can be prevented from becoming too large, and thus a collapse of the switching operation in the power conversion unit (13) caused by an excessive influence of the output of the multiplying unit (801) can be prevented.

DETAILED DESCRIPTION OF EMBODIMENT(S)

Figure 1:
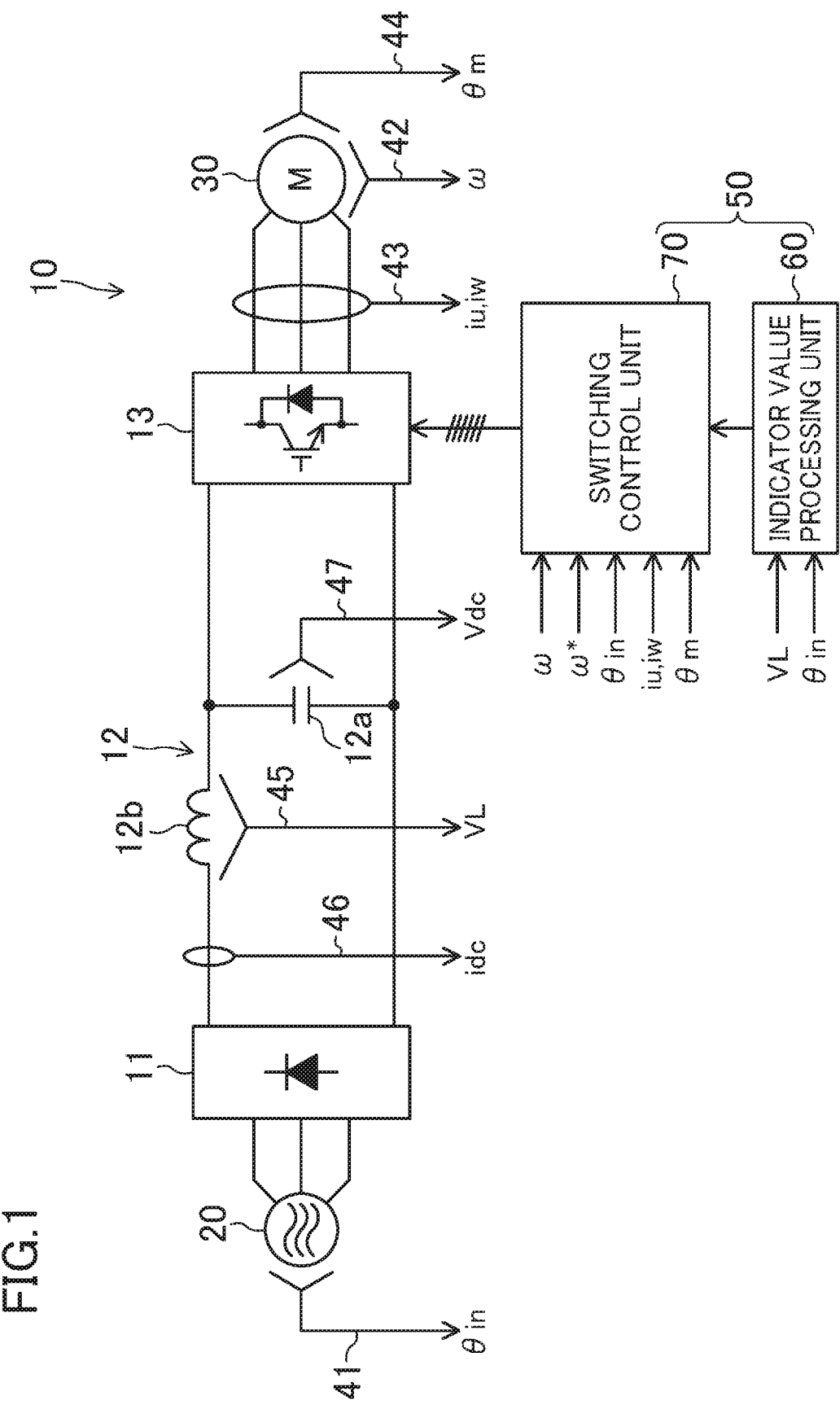
FIG. 1 is a circuit diagram illustrating an example of the configuration of a power conversion device according to Embodiment 1.

Hereinafter, embodiments will be described in detail with reference to the drawings. In the drawings, parts that are identical to each other or correspond to each other are denoted by the same reference numerals, and the description thereof will not be repeated.

Embodiment 1

FIG. 1 illustrates an example of the configuration of a power conversion device (10) according to Embodiment 1, The power conversion device (10) is configured to convert power supplied from an alternating-current (AC) power source (20) into output AC power having a predetermined frequency and voltage and supply the output AC power to a motor (30) (a load). In this example, the AC power source (20) is constituted by a three-phase AC power source, and the motor (30) is constituted by a three-phase AC motor. That is, in this power conversion device (10), predetermined three-phase AC power is generated on the basis of three-phase AC power supplied from the AC power source (20), and the three-phase AC power is supplied to the motor (30) to drive the motor (30). The motor (30) is, for example, an interior permanent magnet motor (IPM motor), and is used to drive a compressor of an air conditioner (not illustrated).

In this example, the power conversion device (10) includes a converter circuit (11), a direct-current (DC) unit (12), and an inverter circuit (13) (a power conversion unit).

[Converter Circuit]

The converter circuit (11) is configured to rectify power supplied from the AC power source (20). In this example, the converter circuit (11) full-wave rectifies AC power specifically, three-phase AC power) supplied from the AC power source (20). For example, the converter circuit (11) is constituted by a diode bridge circuit in which a plurality of rectifier diodes are connected in a bridge shape.

[DC Unit]

The DC unit (12) includes a capacitor (12a) and a reactor (12b). The capacitor (12a) is connected between two input terminals of the inverter circuit (13) and is configured to smooth a ripple caused by a switching operation in the inverter circuit (13). The reactor (12b) is connected between one of two output terminals of the converter circuit (11) and one of the two input terminals of the inverter circuit (13). Alternatively, the reactor (12b) may be provided between the converter circuit (11) and the AC power source (20).

In this example, the capacitance value of the capacitor (12a) is set to a capacitance value that is hardly capable of smoothing an output of the converter circuit (11) and is capable of smoothing a ripple caused by a switching operation in the inverter circuit (13). Specifically, the capacitor (12a) is constituted by a small-capacitance capacitor (for example, a film capacitor) having a capacitance value that is about 1/100 of the capacitance value of a smoothing capacitor (for example, an electrolytic capacitor) used to smooth an output of the converter circuit (11) in a typical power conversion device.

As described above, in this example, the capacitor (12a) is constituted by a small-capacitance capacitor, and thus an output of the converter circuit (11) is hardly smoothed in the DC unit (12). As a result, an output of the DC unit (12) (specifically, the voltage across the capacitor (12a)) has, remaining therein, a pulse component having a frequency that is based on the power source frequency of the AC power source (20) (in this example, a frequency that is six times the power source frequency of the AC power source (20), which is a three-phase AC power source)

[Inverter Circuit (Power Conversion Unit)]

The inverter circuit (13) includes a plurality of switching elements and is configured to convert an output of the DC unit (12) (i.e., DC power obtained by converting AC power output from the AC power source (20)) into AC power (in this example, three-phase AC power) having a predetermined frequency and voltage through a switching operation of the plurality of switching elements. Specifically, the inverter circuit (13) includes a plurality of switching elements and a plurality of freewheeling diodes. In this example, the inverter circuit (13) includes, to supply three-phase AC power to the motor (30), six switching elements that are bridge-connected, and six freewheeling diodes respectively connected in anti-parallel to the six switching elements. More specifically, the inverter circuit (13) includes three switching legs, each including two switching elements connected in series to each other, and middle points of the three switching legs (i.e., connection points between the switching elements on an upper-arm side and the switching elements on a lower-arm side) are respectively connected to windings of three phases (windings of a U-phase, a V-phase, and a W-phase) of the motor (30).

[Various Sensors]

The power conversion device (10) is equipped with various sensors, such as a power source phase detecting unit (41), a motor angular frequency detecting unit (42), a motor current detecting unit (43), a motor phase detecting unit (44), a reactor voltage detecting unit (45), an input current detecting unit (46), and a DC voltage detecting unit (47).

The power source phase detecting unit (41) is configured to detect a phase angle of a power source voltage (Vin) (a power source phase angle ($\theta$in)) of the AC power source (20). The motor angular frequency detecting unit (42) is configured to detect a rotational angular frequency of an electrical angle of the motor (30) (a motor angular frequency ($\omega$)). The motor current detecting unit (43) is configured to detect motor currents (in this example, a U-phase current (iu) and a W-phase current (iw)) flowing through the windings of the individual phases (not illustrated) of the motor (30). The motor phase detecting unit (44) is configured to detect an electrical angle of a rotor (not illustrated) of the motor (30) (a motor phase angle ($\theta$m)).

The reactor voltage detecting unit (45) is configured to detect a voltage across the reactor (12b) (a reactor voltage (VL)). The input current detecting unit (46) is configured to detect a current (an input current (idc)) supplied to the inverter circuit (13). The DC voltage detecting unit (47) is configured to detect a voltage (a DC voltage (Vdc)) between terminals of the capacitor (12a)

[Controller]

In addition, the power conversion device (10) includes a controller (50). The controller (50) receives a target command value, such as a command value of a rotational angular frequency of an electrical angle (an angular frequency command value ($\omega$*)) of the motor (30), and detection values of the various sensors equipped in the power conversion device (10). On the basis of the target command value, the detection values of the various sensors, or the like, the controller (50) controls a switching operation in the inverter circuit (13) to control the AC power supplied from the inverter circuit (13) to the motor (30). For example, the controller (50) is constituted by a computational processing unit such as a CPU, and a storage unit such as a memory for storing a program and various pieces of information for operating the computational processing unit.

In addition, the controller (50) monitors an indicator value correlated with a disturbance that distorts the input current (idc) supplied to the inverter circuit (13). The controller 50 compensates a manipulated variable of control of a switching operation in the inverter circuit (13) in accordance with at least a frequency component closest to a resonant frequency (fLC) of the DC unit (12) among a plurality of frequency components that are included in variations in the indicator value and that correspond to integral multiples of a power source frequency (fp) of the AC power source (20).

<Disturbance>

The disturbance that distorts the input current (idc) is, for example, a disturbance of a repeating waveform such as a resonance phenomenon (LC resonance) that occurs in the DC unit (12). Such a disturbance has a period based on a power source period (Pin) of the AC power source (20). For example, the period of the disturbance of a repeating waveform resulting from a resonance phenomenon in the DC unit (12) corresponds to a period that is ⅙ of the power source period (Pin) of the AC power source (20), which is a three-phase AC power source.

<Indicator Value>

The indicator value changes according to the disturbance that distorts the input current (idc). Specifically, the indicator value increases as the disturbance that distorts the input current (idc) increases. In this example, the reactor voltage (VL), which is the voltage across the reactor (12b), is used as the indicator value.

<Frequency Component Causing Disturbance that Distorts Input Current>

Figure 4:
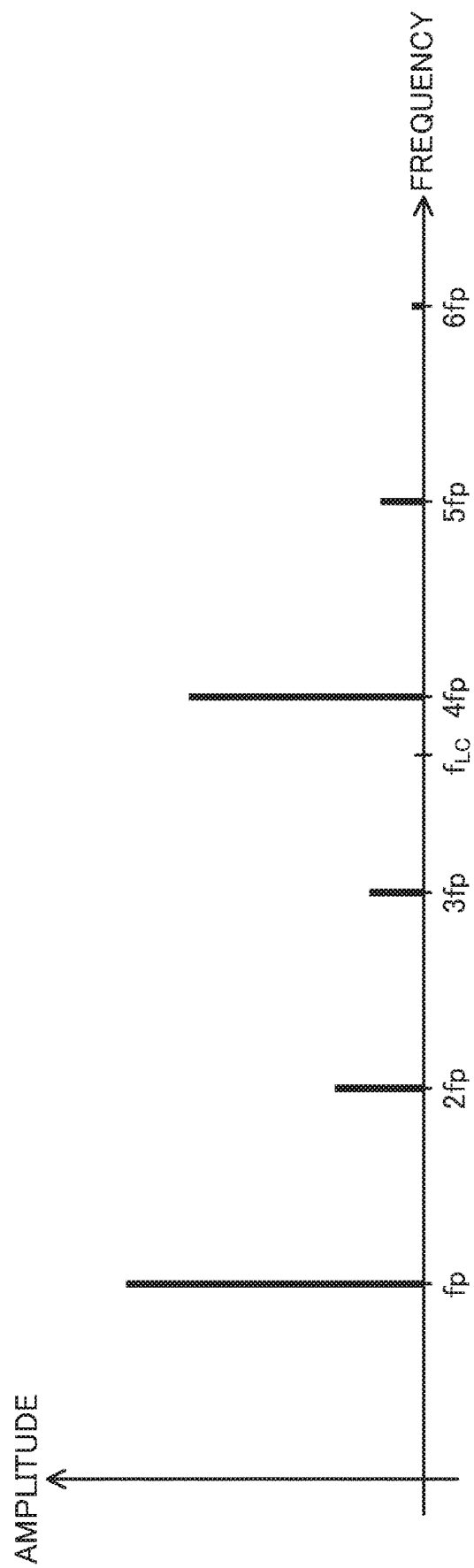
FIG. 4 is a graph illustrating an example of a frequency component causing a disturbance that distorts an input current.

As illustrated in FIG. 4, variations in the indicator value (in this example, the reactor voltage (VL)) include a plurality of frequency components corresponding to integral multiples of the power source frequency (fp) of the AC power source (20). The plurality of frequency components corresponding to integral multiples of the power source frequency (fp) of the AC power source (20) cause a disturbance that distorts the input current (idc). Among the plurality of frequency components corresponding to integral multiples of the power source frequency (fp) of the AC power source (20), the frequency component closest to the resonant frequency (fLC) of the DC unit (12) tends to be relatively large. In the example in FIG. 4, a first frequency component corresponds to the power source frequency (fp) of the AC power source (20), and second, third, fourth, fifth, and sixth frequency components respectively correspond to twice, three times, four times, five times, and six times the power source frequency (fp) of the AC power source (20). Among the six frequency components, the fourth frequency component closest to the resonant frequency (fLC) of the DC unit (12) is relatively large.

[Configuration of Controller]

In this example, the controller (50) includes an indicator value processing unit (60) and a switching control unit (70).

[Indicator Value Processing Unit]

The indicator value processing unit (60) is configured to process a value correlated with a disturbance that distorts the input current (idc), which is a current supplied to the inverter circuit (13) (hereinafter referred to as an "indicator value"). Specifically, the indicator value processing unit (60) is configured to perform a storage operation of processing and storing an indicator value input thereto and an output operation of outputting the indicator value (an integral of the indicator value) processed and stored in the storage operation.

[Switching Control Unit]

The switching control unit (70) is configured to control a switching operation in the inverter circuit (13). In this example, the switching control unit (70) controls a switching operation in the inverter circuit (13) by pulse-width modulation control.

<Update Operation>

The switching control unit (70) is configured to perform an operation of updating a manipulated variable of control of a switching operation in the inverter circuit (13) (an update operation) in a predetermined period (hereinafter referred to as an "update period"). In the update operation by the switching control unit (70), an acquisition operation, a derivation operation, a compensation operation, and a generation operation are performed in order.

In the acquisition operation, the switching control unit (70) acquires information that is necessary to derive a manipulated variable of control of a switching operation in the inverter circuit (13) (hereinafter referred to as a "control manipulated variable"). In the derivation operation, the switching control unit (70) derives a control manipulated variable on the basis of the information acquired in the acquisition operation.

In the compensation operation, the switching control unit (70) compensates the control manipulated variable (the manipulated variable of control of the switching operation in the inverter circuit (13)) derived in the derivation operation, on the basis of an output of the indicator value processing unit (60) (in this example, the integral of an indicator value stored for each of storage phase angles (θs) in a first storage processing unit (200), which will be described below)

In the generation operation, the switching control unit (70) generates an output of the switching control unit (70) (specifically, a signal for controlling a switching operation in the inverter circuit (13)) on the basis of the control manipulated variable compensated in the compensation operation. In this way, the output of the switching control unit (70) is updated in each update period.

<Update Period>

The update period of the switching control unit (70) is set to, for example, a period based on the power source period (Pin) of the AC power source (20). In this example, the update period of the switching control unit (70) is set to a period that is 1/(6×k) of the power source period (Pin) of the AC power source (20), which is a three-phase AC power source. That is, in this example, an update operation is performed (6×k) times during one power source period (Pin). Note that k is an integer greater than or equal to 1.

[Configuration of Indicator Value Processing Unit]

Figure 2:
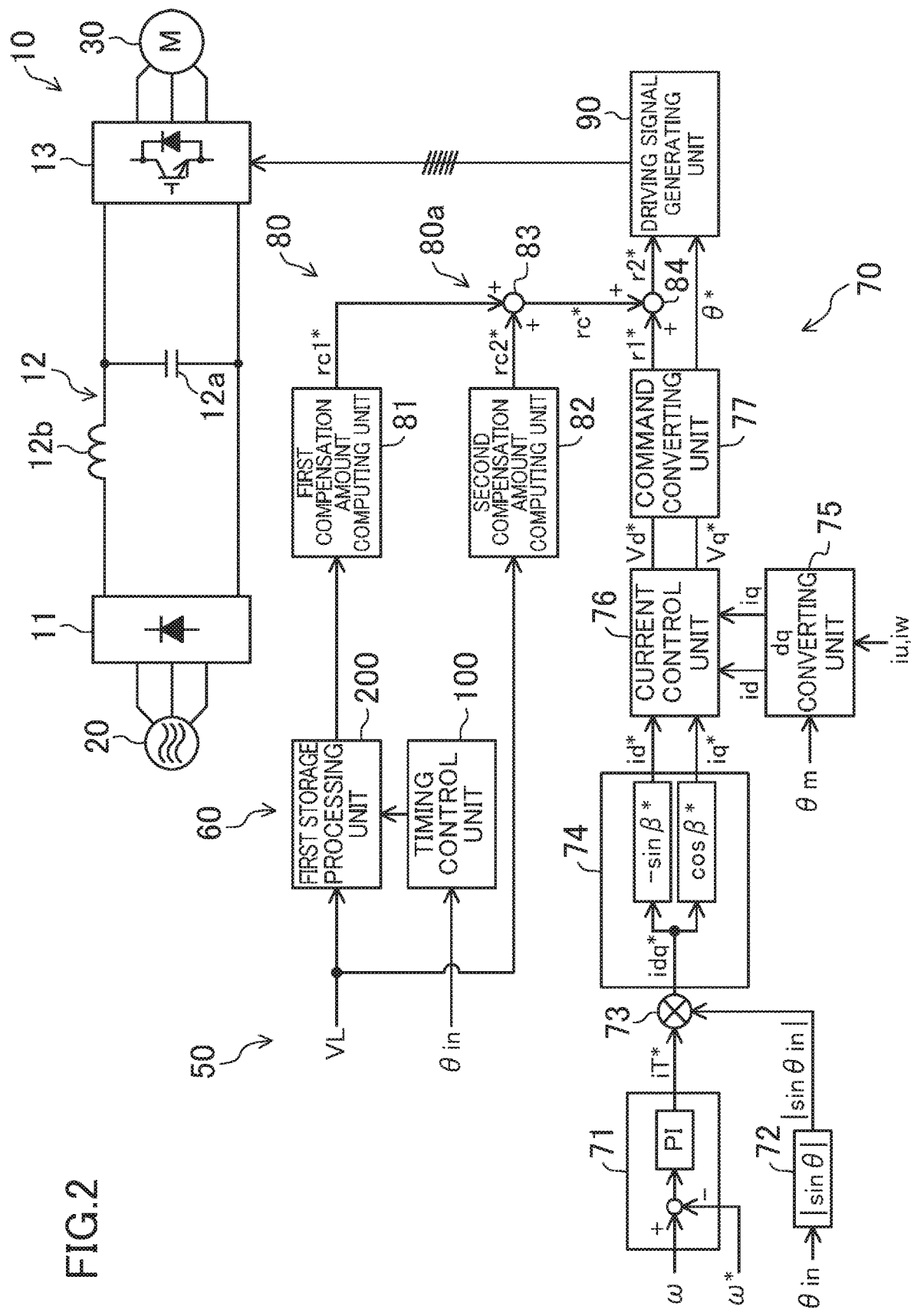
FIG. 2 is a block diagram illustrating an example of the configuration of a controller according to Embodiment 1.

As illustrated in FIG. 2, in this example, the indicator value processing unit (60) includes a timing control unit (100) and the first storage processing unit (200).

<Timing Control Unit>

The timing control unit (100) is configured to control the timing of an operation in the indicator value processing unit (60).

<First Storage Processing Unit: Storage Operation>

The first storage processing unit (200) is configured to perform, for each of storage phase angles (θs) predetermined in a storage period (Ps), an operation of computing and storing an integral of an indicator value at the storage phase angle (θs) (a storage operation). In this storage operation, the integrals of k (k is an integer greater than or equal to 2) indicator values respectively corresponding to k storage phase angles (θs) predetermined in the storage period (Ps) are stored in the first storage processing unit (200).

In this example, the first storage processing unit (200) is configured to, for each storage phase angle (θs), add an indicator value acquired at the storage phase angle (θs) and the integral of the indicator value stored in the first storage processing unit (200) (the integral of the indicator value at the storage phase angle (θs)), and update the integral of the indicator value stored in the first storage processing unit (200) (the integral of the indicator value at the storage phase angle (θs)) to a value acquired through the addition.

<<Storage Period>>

The storage period (Ps) is set to a period that is based on the power source period (Pin) of the AC power source (20). In this example, the storage period (Ps) is set to a period that is an integral multiple of ⅙ of the power source period (Pin) (specifically, a period that is ⅙ of the power source period (Pin)). In this example, the update period of the switching control unit (70) is set to a period that is 1/(6×k) of the power source period (Pin). That is, in this example, an update operation by the switching control unit (70) is performed k times during one storage period (Ps).

<<Storage Phase Angle>>

The k storage phase angles (θs) predetermined in the storage period (Ps) respectively correspond to the timings to start the k update operations performed by the switching control unit (70) in the storage period (Ps). That is, the integral of the indicator value at the j-th (j is an integer greater than or equal to 0 and smaller than or equal to k−1) storage phase angle (θs) among the k storage phase angles (θs) in the storage period (Ps) corresponds to the j-th update operation among the k update operations performed by the switching control unit (70) in the storage period (Ps).

<<Timing to Acquire Indicator Value>>

The timings to acquire an indicator value (in this example, the reactor voltage (VL)) in the storage period (Ps) correspond to the k storage phase angles (θs) predetermined in the storage period (Ps). In this example, k acquisition timings (indicator value acquisition timings) in the storage period (Ps) respectively correspond to the k storage phase angles (θs) in the storage period (Ps). That is, in this example, an indicator value is acquired at each of the k storage phase angles (θs) in the storage period (Ps).

<First Storage Processing Unit: Output Operation>

The first storage processing unit (200) is configured to perform an operation of sequentially outputting the integrals of the indicator values stored for the individual storage phase angles (θs) (an output operation). Specifically, the first storage processing unit (200) outputs, for each of output phase angles (θo) predetermined in an output period, the integral of the indicator value corresponding to the output phase angle (θo) among the integrals of the indicator values stored for the individual storage phase angles (θs). In this output operation, for each of k output phase angles (θo) predetermined in the output period, the integral of the indicator value corresponding to the output phase angle (θo) among the integrals of the k indicator values stored in the first storage processing unit (200) (the integrals of the k indicator values respectively corresponding to the k storage phase angles (θs)) is output.

<<Output Period>>

The length of the output period is identical to the length of the storage period (Ps). In this example, the output period is set to a period that is an integral multiple of ⅙ of the power source period (Pin) (specifically, a period that is ⅙ of the power source period (Pin)), like the storage period (Ps).

<<Output Phase Angle>>

The k output phase angles (θo) predetermined in the output period respectively correspond to the k storage phase angles (θs) predetermined in the storage period (Ps). That is, the integral of the indicator value output from the first storage processing unit (200) at the j-th output phase angle (θo) among the k output phase angles (θo) in the output period corresponds to the integral of the indicator value at the j-th storage phase angle (θs) among the k storage phase angles (θs) in the storage period (Ps).

In addition, the k output phase angles (θo) predetermined in the output period respectively correspond to the timings to start compensation operations in the k update operations performed by the switching control unit (70) in the storage period (Ps). That is, the integral of the indicator value output from the first storage processing unit (200) at the j-th output phase angle (θo) among the k output phase angles (θo) in the output period is used in the compensation operation in the j-th update operation among the k update operations performed by the switching control unit (70) in the storage period (Ps).

<Configuration of Timing Control Unit>

Figure 3:
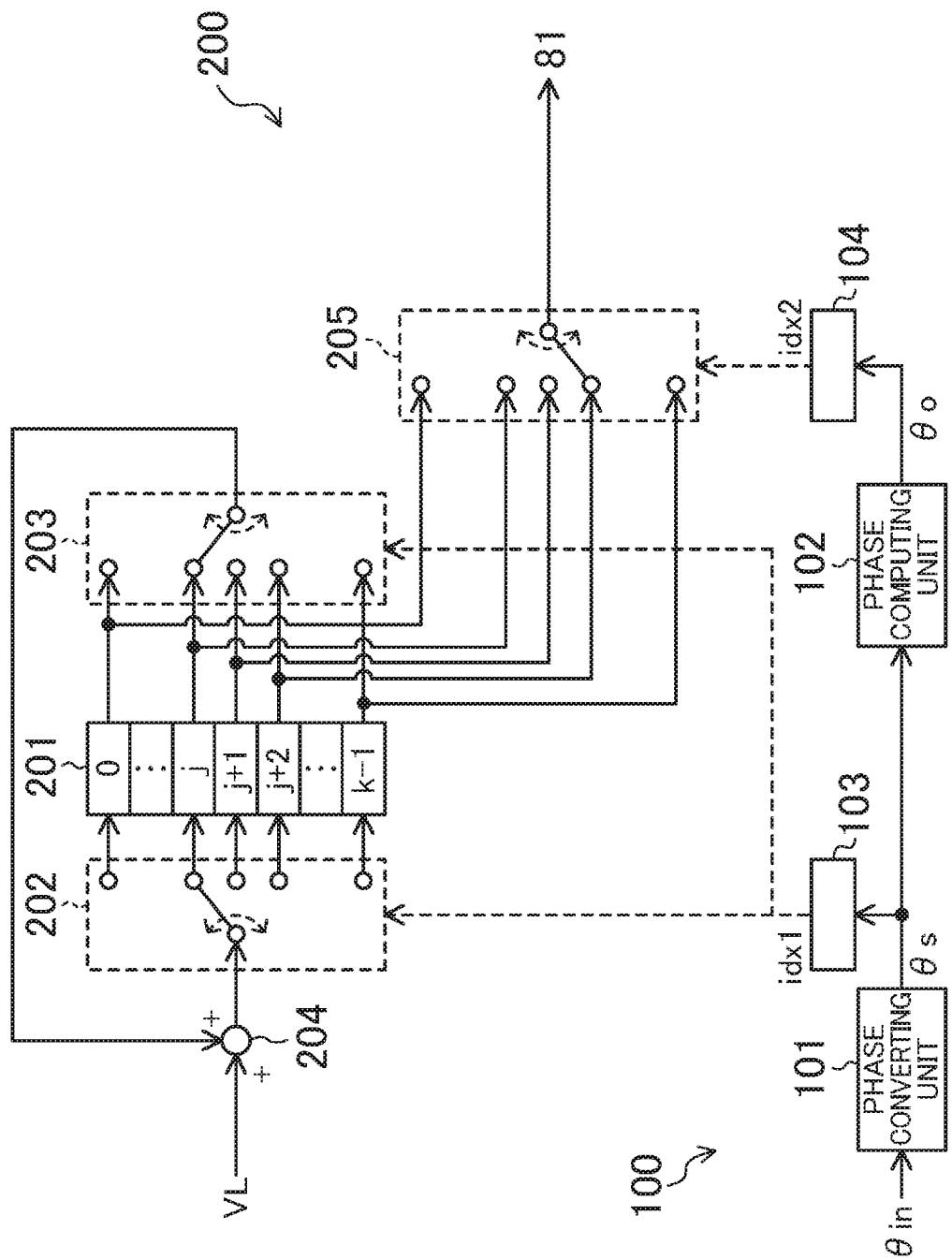
FIG. 3 is a block diagram illustrating an example of the configuration of an indicator value processing unit according to Embodiment 1.

As illustrated in FIG. 3, in this example, the timing control unit (100) includes a phase converting unit (101), a phase computing unit (102), an input index generating unit (103), and an output index generating unit (104).

<<Phase Converting Unit>>

The phase converting unit (101) is configured to convert a power source phase angle (the power source phase angle (θin) in the power source period (Pin) of the AC power source (20)) detected by the power source phase detecting unit (41) into the storage phase angle (θs) in the storage period (Ps). The storage phase angle (θs) acquired by the phase converting unit (101) gradually increases from zero toward 2π as time elapses.

<<Phase Computing Unit>>

The phase computing unit (102) is configured to compute the output phase angle (θo) in the output period on the basis of the storage phase angle (θs) acquired by the phase converting unit (101). For example, the phase computing unit (102) delays the storage phase angle (θs) in the storage period (Ps) by a predetermined amount to generate the output phase angle (θo) in the output period. The output phase angle (θo) acquired by the phase computing unit (102) gradually increases from zero toward 2π as time elapses, like the storage phase angle (θs) acquired by the phase converting unit (101).

<<Input Index Generating Unit>>

The input index generating unit (103) is configured to generate an input index (idx1) on the basis of the storage phase angle (θs) acquired by the phase converting unit (101). The input index (idx1) indicates the number corresponding to the storage region to be selected from among k storage regions, which will be described below. The number of the input index (idx1) is any one of integers from 0 to k−1.

Specifically, the input index generating unit (103) sets the number of the input index (idx1) to "j" when the storage phase angle acquired by the phase converting unit (101) (the storage phase angle (θs) in the storage period (Ps)) becomes the predetermined j-th storage phase angle (θs). In this example, the j-th storage phase angle (θs) among the k storage phase angles (θs) in the storage period (Ps) is "(2π/k)×j". The number of the input index (idx1) is "θs/(2π/k)".

<<Output Index Generating Unit>>

The output index generating unit (104) is configured to generate an output index (idx2) on the basis of the output phase angle (θo) acquired by the phase computing unit (102). The output index (idx2) indicates the number corresponding to the storage region to be selected from among the k storage regions, which will be described below. The number of the output index (idx2) is any one of integers from 0 to k−1.

Specifically, the output index generating unit (104) sets the number of the output index (idx2) to "j" when the output phase angle acquired by the phase computing unit (102) (the output phase angle (θo) in the output period) becomes the j-th output phase angle (θo) among the k output phase angles (θo) predetermined in the output period. In this example, the j-th output phase angle (θo) among the k output phase angles (θo) in the output period is "(2π/k)×j". The number of the output index (idx2) is "θs/(2π/k)".

<Configuration of First Storage Processing Unit>

As illustrated in FIG. 3, in this example, the first storage processing unit (200) includes a first storage unit (201), a first input selecting unit (202), an integral selecting unit (203), an adder (204), and a first output selecting unit (205).

<<First Storage Unit>>

The first storage unit (201) includes the k storage regions respectively corresponding to the predetermined k storage phase angles (θs). In each of the k storage regions of the first storage unit (201), a corresponding one of the integrals of the k indicator values corresponding to the k storage phase angles (θs) is stored. Specifically, in the j-th storage region of the first storage unit (201), the integral of the indicator value at the j-th storage phase angle (θs) is stored, <<First Input Selecting Unit>>

The first input selecting unit (202) is configured to select any one of the k storage regions of the first storage unit (201) on the basis of the input index (idx1) generated by the input index generating unit (103).

<<Integral Selecting Unit>>

The integral selecting unit (203) is configured to select any one of the k storage regions of the first storage unit (201) on the basis of the input index (idx1) generated by the input index generating unit (103), and read out the integral of the indicator value stored in the selected storage region. The storage region selected by the integral selecting unit (203) is identical to the storage region selected by the first input selecting unit (202).

<<Adder>>

The adder (204) is configured to add an indicator value input thereto (in this example, the reactor voltage (VL)) and the integral of the indicator value read out by the integral selecting unit (203). An output of the adder (204) (a new integral of the indicator value) is stored in the storage region selected by the first input selecting unit (202) among the k storage regions of the first storage unit (201). Accordingly, the integral of the indicator value stored in the storage region selected by the first input selecting unit (202) among the k storage regions of the first storage unit (201) is updated.

<<First Output Selecting Unit>>

The first output selecting unit (205) is configured to select any one of the k storage regions of the first storage unit (201) on the basis of the output index (idx2) generated by the output index generating unit (104), read out the integral of the indicator value stored in the storage region, and output the integral.

[Storage Operation by First Storage Processing Unit]

Next, a storage operation by the first storage processing unit (200) will be described with reference to FIG. 5. In this example, the first storage processing unit (200) stores the integrals of k indicator values (in this example, the integrals of reactor voltages (VL)) respectively corresponding to the k storage phase angles (θs) predetermined in the storage period (Ps). The storage period (Ps) is set to a period that is ⅙ of the power source period (Pin) of the AC power source (20). At each of the k storage phase angles (θs) in the storage period (Ps), an indicator value (in this example, the reactor voltage (VL)) is acquired.

Figure 5:
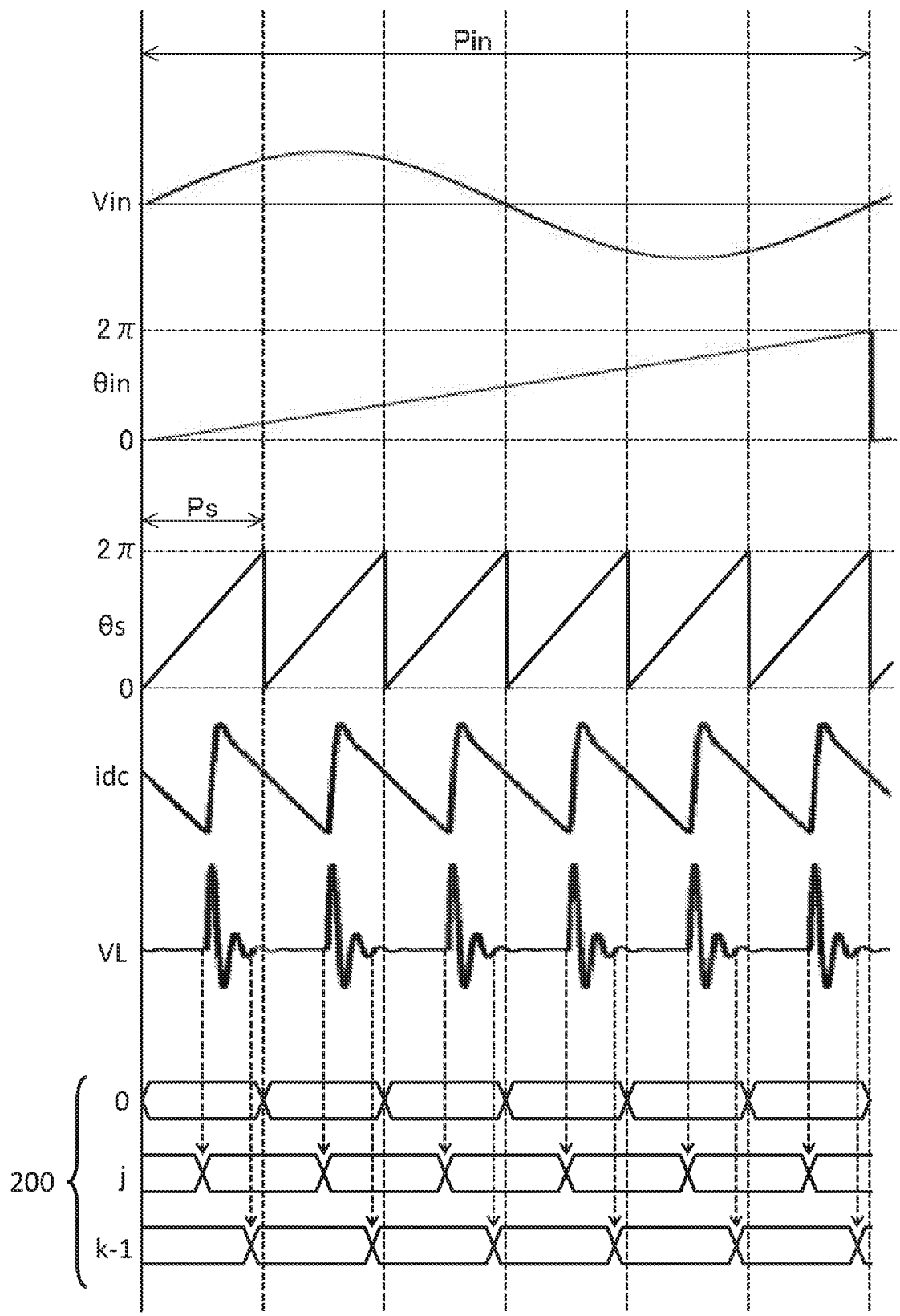
FIG. 5 is a timing chart for describing a storage operation by a first storage processing unit according to Embodiment 1.

As illustrated in FIG. 5, in the power source period (Pin) of the AC power source (20) (i.e., the period of the power source voltage (Vin) of the AC power source (20)), the power source phase angle (θin) gradually increases from zero toward 2π as time elapses. The phase converting unit (101) of the timing control unit (100) converts the power source phase angle (θin) in the power source period (Pin) into storage phase angles (θs) in storage periods (Ps). Accordingly, a plurality of storage periods (Ps) are defined in this example, six storage periods (Ps) are defined in one power source period (Pin) of the AC power source (20).

As illustrated in FIG. 5, in each of the plurality of storage periods (Ps), when the storage phase angle (θs) becomes the predetermined j-th storage phase angle (θs), an indicator value (in this example, the reactor voltage (VL)) at the j-th storage phase angle (θs) is acquired, and the acquired indicator value is used to update the integral of the j-th indicator value among the integrals of the k indicator values (in this example, the integrals of the reactor voltages (VL)) stored in the first storage processing unit (200).

In this way, the integrals of the indicator values stored for the respective k storage phase angles (θs) (i.e., the integrals of the k indicator values) are updated in each storage period (Ps).

[Details of Storage Operation by First Storage Processing Unit]

Figure 6:
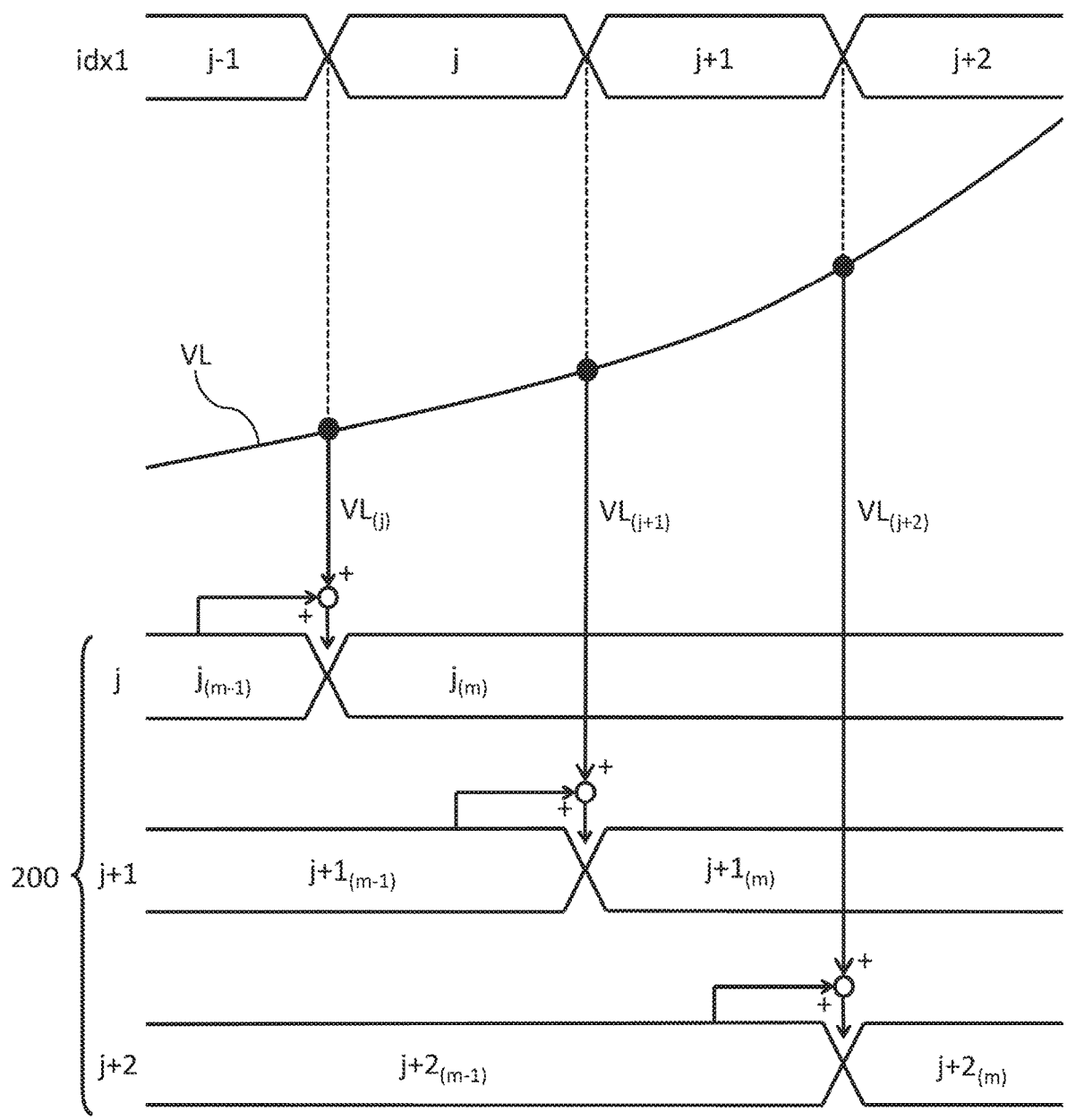
FIG. 6 is a timing chart for describing a storage operation by the first storage processing unit according to Embodiment 1.

Next, the storage operation by the first storage processing unit (200) will be described in detail with reference to FIG. 6. FIG. 6 illustrates changes in the number of the input index (idx1), the reactor voltage (VL), and the values stored in the first storage processing unit (200) (the integrals of the k indicator values) in the m-th storage period (Ps). In FIG. 6, the reactor voltage (VL) is used as an indicator value as an example.

As illustrated in FIG. 6, in the m-th storage period (Ps), when the storage phase angle (θs) becomes the predetermined j-th storage phase angle (θs), the number of the input index (idx1) becomes "j". In addition, the reactor voltage (VL) is acquired at the j-th storage phase angle (θs). For example, the reactor voltage detecting unit (45) detects the reactor voltage (VL) at the j-th storage phase angle (θs), and the detected reactor voltage (VL) is input to the first storage processing unit (200).

In the first storage processing unit (200), the integral of the j-th reactor voltage (VL) stored in the j-th storage region of the first storage unit (201) is read out. Subsequently, the reactor voltage (VL) acquired at the j-th storage phase angle (θs) and the integral of the j-th reactor voltage (VL) read out from the j-th storage region of the first storage unit (201) are added, and a value acquired through the addition (a new integral of the j-th reactor voltage (VL)) is stored in the j-th storage region of the first storage unit (201). Accordingly, the integral of the j-th reactor voltage (VL) stored in the j-th storage region of the first storage unit (201) (i.e., the integral of the reactor voltage (VL) at the j-th storage phase angle (θs)) is updated.

Here, the pre-update integral of the reactor voltage (VL) stored in the j-th storage region of the first storage unit (201) is represented by "$j_{(m-1)}$", the reactor voltage (VL) acquired at the j-th storage phase angle (θs) is represented by "$VL_{(j)}$", and the post-update integral of the reactor voltage (VL) to be stored in the j-th storage region of the first storage unit (201) is represented by "$j_{(m)}$," and then $j_{(m)}=j_{(m-1)}+VL_{(j)}$ holds.

Subsequently, in the m-th storage period (Ps), when the storage phase angle (θs) becomes the predetermined j+1-th storage phase angle (θs), the number of the input index (idx1) becomes "j+1". In addition, the reactor voltage (VL) is acquired at the j+1-th storage phase angle (θs). Subsequently, in the first storage processing unit (200), the integral of the j+1-th reactor voltage (VL) stored in the j+1-th storage region of the first storage unit (201) (i.e., the integral of the reactor voltage (VL) at the, j+1-th storage phase angle (θs)) is updated.

Here, the pre-update integral of the reactor voltage (VL) stored in the j+1-th storage region of the first storage unit (201) is represented by "$j+1_{(m-1)}$", the reactor voltage (VL) acquired at the j+1-th storage phase angle (θs) is represented by "$VL_{(j+1)}$", and the post-update integral of the reactor voltage (VL) to be stored in the j+1-th storage region of the first storage unit (201) is represented by "$j+1_{(m)}$", and then $j+1_{(m)}=j+1_{(m-1)}+VL_{(j+1)}$ holds.

Subsequently, in the m-th storage period (Ps), when the storage phase angle (θs) becomes the predetermined j+2-th storage phase angle (θs), the number of the input index (idx1) becomes "j+2". In addition, the reactor voltage (VL) is acquired at the j+2-th storage phase angle (θs). Subsequently, in the first storage processing unit (200), the integral of the j+2-th reactor voltage (VL) stored in the j+2-th storage region of the first storage unit (201) (i.e., the integral of the reactor voltage (VL) at the j+2-th storage phase angle (θs)) is updated.

Here, the pre-update integral of the reactor voltage (VL) stored in the j+2-th storage region of the first storage unit (201) is represented by "$j+2_{(m-1)}$", the reactor voltage (VL) acquired at the j+2-th storage phase angle (θs) is represented by "$VL_{(j+2)}$", and the post-update integral of the reactor voltage (VL) to be stored in the j+2-th storage region of the first storage unit (201) is represented by "$j+2_{(m)}$", and then $j+2_{(m)}=j+2_{(m-1)}+VL_{(j-2)}$ holds.

The above-described operation is repeatedly performed in each storage period (Ps), and the integral of the indicator value stored for each storage phase angle (θs) (in this example, the integral of the reactor voltage (VL)) is updated in each storage period (Ps).

[Configuration of Switching Control Unit]

As illustrated in FIG. 2, in this example, the switching control unit (70) includes a velocity control unit (71), a pulse command generating unit (72), a multiplier (73), a current command generating unit (74), a dq converting unit (75), a current control unit (76), a command converting unit (77), a compensating unit (80), and a driving signal generating unit (90).

<Velocity Control Unit>

The velocity control unit (71) is configured to derive a deviation between a detection value of the motor angular frequency detecting unit (42) (i.e., the motor angular frequency (ω)) and a command value of the rotational angular frequency of the electrical angle of the motor (30) (the angular frequency command value (ω*) and perform a proportional-plus-integral operation on the deviation, thereby deriving a torque command value (iT*).

<Pulse Command Generating Unit>

The pulse command generating unit (72) is configured to derive, on the basis of a detection value of the power source phase detecting unit (41) (i.e., the power source phase angle (θin)), a pulse command value (in this example, an absolute value (|sin θin|) of a sine value of the power source phase angle (θin)) for causing pulsation in accordance with the frequency of the power source voltage (Vin) of the AC power source (20).

<Multiplier>

The multiplier (73) is configured to multiply the torque command value (iT*) derived by the velocity control unit (71) by the pulse command value derived by the pulse command generating unit (72) (in this example, the absolute value (|sin θin|) of the sine value of the power source phase angle (θin)), thereby deriving a current command value (idq*).

<Current Command Generating Unit>

The current command generating unit (74) is configured to derive, on the basis of the current command value (idq*) derived by the multiplier (73) and a command value (β*) of the phase angle of the motor current, a d-axis current command value (id*) and a q-axis current command value (iq*). Specifically, the current command generating unit (74) multiplies the current command value (idq*) by a sine value (−sin β*) of the command value (β*) to derive the d-axis current command value (id*), and multiplies the current command value (idq*) by a cosine value (cos β*) of the command value (β*) to derive the q-axis current command value (iq*).

<dq Converting Unit>

The dq converting unit (75) is configured to derive a d-axis current (id) and a q-axis current (iq) of the motor (30) on the basis of a detection value of the motor current detecting unit (43) (in this example, the U-phase current (iu) and the W-phase current (iw)) and a detection value of the motor phase detecting unit (44) (i.e., the motor phase angle (θm)).

<Current Control Unit>

The current control unit (76) is configured to derive a d-axis voltage command value (Vd*) and a q-axis voltage command value (Vq*) on the basis of the d-axis current command value (id*) and the q-axis current command value (iq*) derived by the current command generating unit (74), and the d-axis current (id) and the q-axis current (iq) derived by the dq converting unit (75). Specifically, the current control unit (76) derives the d-axis voltage command value (Vd*) and the q-axis voltage command value (Vq*) such that a deviation between the d-axis current command value (id*) and the d-axis current (id) and a deviation between the q-axis current command value (iq*) and the q-axis current (iq) become small.

<Command Converting Unit>

The command converting unit (77) is configured to derive a voltage amplitude command value d a voltage phase command value (θ*) on the basis of the d-axis voltage command value (Vd*) and the q-axis voltage command value (Vq*) derived by the current control unit (76).

<Compensating Unit>

The compensating unit (80) is configured to compensate the voltage amplitude command value (r1*) derived by the command converting unit (77) on the basis of an output of the indicator value processing unit (60), and output a compensated voltage amplitude command value (r2*). That is, in this example, the switching control unit (70) is configured to control (compensate) the voltage in the inverter circuit (13) on the basis of an output of the indicator value processing unit (60) (specifically, the integral of the indicator value stored for each storage phase angle (θs) in the first storage processing unit (200)).

In addition, in this example, the compensating unit (80) includes a compensation amount computing unit (80a) and a compensation processing unit (84).

<<Compensation Amount Computing Unit>>

The compensation amount computing unit (80a) derives a compensation amount (rc*) that is based on at least the frequency component closest to the resonant frequency (fLC) of the DC unit (12) among the plurality of frequency components that are included in variations in the indicator value and that correspond to integral multiples of the power source frequency (fp) of the AC power source (20). In this example, the compensation amount computing unit (80a) includes a first compensation amount computing unit (81), a second compensation amount computing unit (82), and an adder (83).

The first compensation amount computing unit (81) is configured to derive a first compensation amount (rc1*) on the basis of the integral of the indicator value this example, the integral of the reactor voltage (YL)) output from the first storage processing unit (200). For example, the first compensation amount computing unit (81) derives the first compensation amount (rc1*) by multiplying the integral of the indicator value output from the first storage processing unit (200) by a predetermined first compensation coefficient.

The second compensation amount computing unit (82) is configured to derive a second compensation amount (rc2*) on the basis of the indicator value input thereto (in this example, the reactor voltage (VL) detected by the reactor voltage detecting unit (45)). For example, the second compensation amount computing unit (82) derives the second compensation amount (rc2*) by multiplying the input indicator value by a predetermined second compensation coefficient.

The adder (83) adds the first compensation amount (rc1*) derived by the first compensation amount computing unit (81) and the second compensation amount (rc2*) derived by the second compensation amount computing unit (82) to derive the compensation amount (rc*).

<<Compensation Processing Unit>>

The compensation processing unit (84) compensates a manipulated variable of control of a switching operation in the inverter circuit (13) on the basis of an output of the compensation amount computing unit (80a) (i.e., the compensation amount (rc*)). In this example, the compensation processing unit (84) is constituted by an adder.

The adder constituting the compensation processing unit (4) adds the voltage amplitude command value (r1*) derived by the command converting unit (77) and the compensation amount (rc*) derived by the adder (83) to derive the compensated voltage amplitude command value (r2*).

<Driving Signal Generating Unit>

The driving signal generating unit (90) is configured to generate a driving signal for controlling ON/OFF of the switching elements of the inverter circuit (13), on the basis of the compensated voltage amplitude command value (r2*) output from the compensating unit (80) and the voltage phase command value (θ*) derived by the command converting unit (77).

[Operation of Power Conversion Device]

Figure 7:
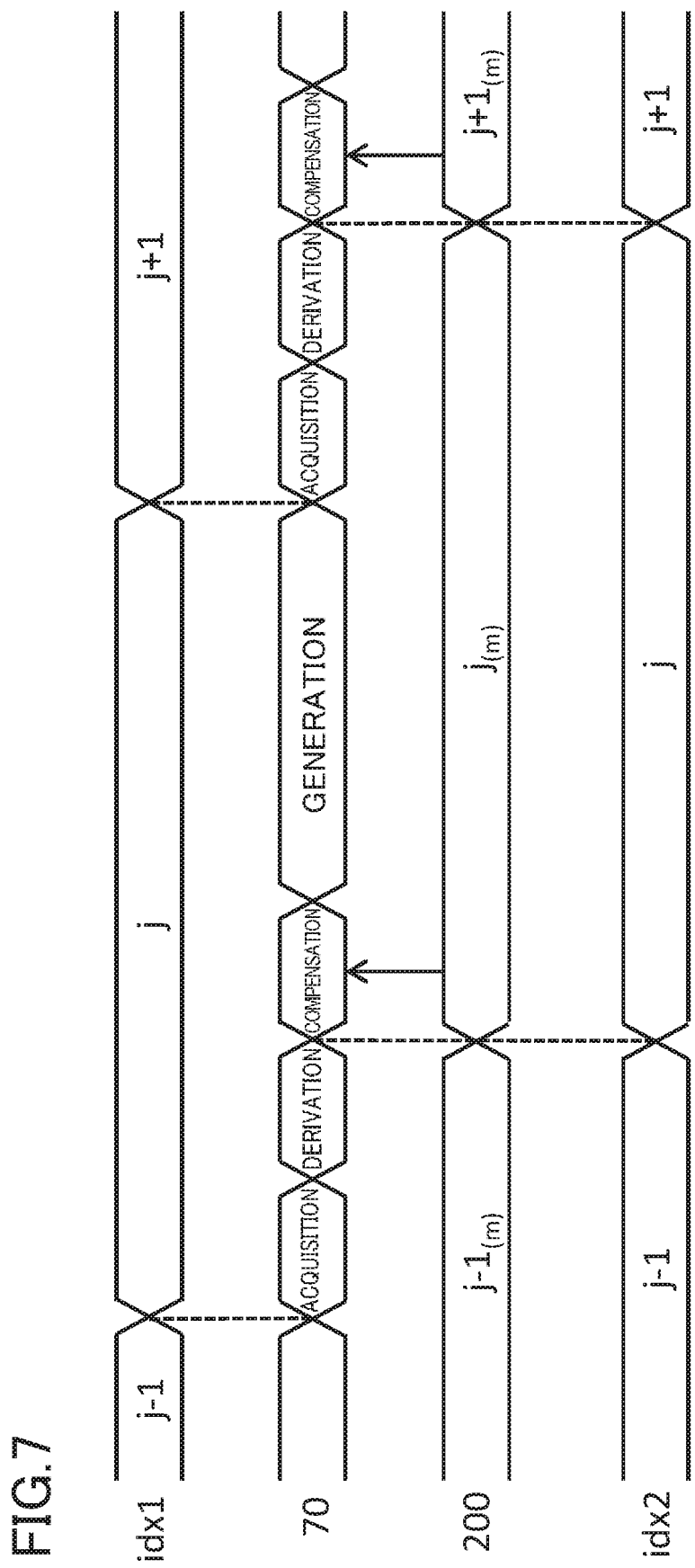
FIG. 7 is a timing chart for describing an operation of the power conversion device according to Embodiment 1.

Next, an operation of the power converting device (10) will be described with reference to FIG. 7. FIG. 7 illustrates changes in the number of the input index (idx1), the operation of the switching control unit (70), the number of the output index (idx2), and the output of the first storage processing unit (200) in the m-th storage period (Ps). In the example in FIG. 7, the k storage phase angles (θs) in the storage period (Ps) respectively synchronize with the timings to start the k update operations performed by the switching control unit (70) in the storage period (Ps), and the k output phase angles (θo) in the output period respectively synchronize with the timings to start the compensation operations in the k update operations performed by the switching control unit (70) in the storage period (Ps). In the power conversion device (10), the following operation is repeatedly performed in each storage period (Ps).

As illustrated in FIG. 7, in response to start of the j-th update operation by the switching control unit (70) in the m-th storage period (Ps), the input index (idx1) becomes "j". Accordingly, in the first storage processing unit (200), the integral of the j-th indicator value stored in the j-th storage region of the first storage unit (201) (the integral of the indicator value at the j-th storage phase angle (θs)) is updated.

In addition, in response to start of the j-th update operation by the switching control unit (70) in the m-th storage period (Ps), an acquisition operation is started in the switching control unit (70). In this acquisition operation, information that is necessary to derive a control manipulated variable (in this example, the motor angular frequency (ω), the power source phase angle (θin), the U-phase current (iu), the W-phase current (iw), the motor phase angle (θm), and the like) is acquired.

In response to completion of the acquisition operation in the j-th update operation by the switching control unit (70), a derivation operation is started in the switching control unit (70). In this derivation operation, a control manipulated variable is derived on the basis of the information acquired in the acquisition operation. Specifically, the velocity control unit (71) derives a torque command value (iT*) on the basis of a deviation between the motor angular frequency (ω) and the angular frequency command value (ω*), and the pulse command generating unit (72) derives a pulse command value (absolute sine value (|sin θin|)) on the basis of the power source phase angle (θin). The multiplier (73) multiplies the torque command value (iT*) by the pulse command value (absolute sine value (|sin θin|) to derive a current command value (idq*), and the current command generating unit (74) derives a d-axis current command value (id*) and a q-axis current command value (iq*) on the basis of the current command value (idq*) and the command value (p*) of the phase angle of the motor current. On the other hand, the dq converting unit (75) derives a d-axis current (id) and a q-axis current (iq) on the basis of the motor current (in this example, the U-phase current (iu) and the W-phase current (iw)) and the motor phase angle (θm). Subsequently, the current control unit (76) derives a d-axis voltage command value (Vd*) and a q-axis voltage command value (Vq*) on the basis of the d-axis current command value (id*), the q-axis current command value (iq*), the d-axis current (id), and the q-axis current (iq), and the command converting unit (77) derives a voltage amplitude command value (r1*) and a voltage phase command value (θ*) on the basis of the d-axis voltage command value (Vd*) and the q-axis voltage command value (Vq*). In this way, a control manipulated variable (in this example, the voltage amplitude command value (r1*) and the voltage phase command value (θ*)) is derived.

In response to completion of the derivation operation in the j-th update operation by the switching control unit (70), a compensation operation is started in the switching control unit (70). In response to start of the compensation operation in the j-th update operation by the switching control unit (70), the output phase angle (θo) in the output period becomes the predetermined j-th output phase angle (θo), and the output index (idx2) becomes "j". Accordingly, in the first storage processing unit (200), the integral of the j-th indicator value stored in the j-th storage region of the first storage unit (201) (i.e., the integral ($j_{(m)}$) of the indicator value at the j-th storage phase angle (θs) updated in the m-th storage period (Ps)) is output to the switching control unit (70).

On the other hand, in the compensation operation in the j-th update operation by the switching control unit (70), the control manipulated variable derived in the derivation operation is compensated on the basis of the output of the indicator value processing unit (60) (i.e., the integral of the indicator value at the j-th storage phase angle (θs)). Specifically, the first compensation amount computing unit (81) derives a first compensation amount (rc1*) on the basis of the integral of the indicator value output from the first storage processing unit (200), the second compensation amount computing unit (82) derives a second compensation amount (rc2*) on the basis of the indicator value input thereto (i.e., the indicator value at the j-th storage phase angle (θs)), and the adder (83) adds the first compensation amount (rc1*) and the second compensation amount (rc2*) derive a compensation amount (rc*). The compensation processing unit (84) adds the voltage amplitude command value (r1*) derived in the derivation operation and the compensation amount (rc*) to derive a compensated voltage amplitude command value (r2*). In this way, the control manipulated variable is compensated, and the compensated control manipulated variable (in this example, the compensated voltage amplitude command value (r2*)) is acquired.

In response to completion of the compensation operation in the j-th update operation by the switching control unit (70), a generation operation is performed in the switching control unit (70). In this generation operation, an output of the switching control unit (70) is generated on the basis of the compensated control manipulated variable acquired in the compensation operation. Specifically, the driving signal generating unit (90) generates a driving signal for controlling ON/OFF of the switching elements of the inverter circuit (13) on the basis of the compensated voltage amplitude command value (r2*) and the voltage phase command value (θ*).

As described above, in the compensation operation in the j-th update operation performed by the switching control unit (70) in the m-th storage period (Ps), the control manipulated variable is compensated by using the integral of the indicator value at the j-th storage phase angle (θs) corresponding to the j-th update operation by the switching control unit (70) (specifically, the integral ($j_{(m)}$) of the indicator value at the j-th storage phase angle (θs) updated in the m-th storage period (Ps)).

[Comparison Between Embodiment And Comparative Example]

Next, the power conversion device (10) according to Embodiment 1 and a comparative example of the power conversion device will be described in comparison with each other with reference to FIG. 8 and FIG. 9. In this comparative example of the power conversion device, the indicator value processing unit (60), the first compensation amount computing unit (81), and the adder (83) illustrated in FIG. 2 are omitted, and an output of the second compensation amount computing unit (82) is input to the compensation processing unit (84). Other than that, the configuration of the comparative example of the power conversion device is similar to the configuration of the power conversion device (10) illustrated in FIG. 2. That is, in this comparative example of the power conversion device, in the compensation operation by the switching control unit (70), compensation of a manipulated variable based on an indicator value (i.e., proportional control) is performed, but control of a manipulated variable based on the integral of the indicator value (i.e., integral control) is not performed.

Figure 8:
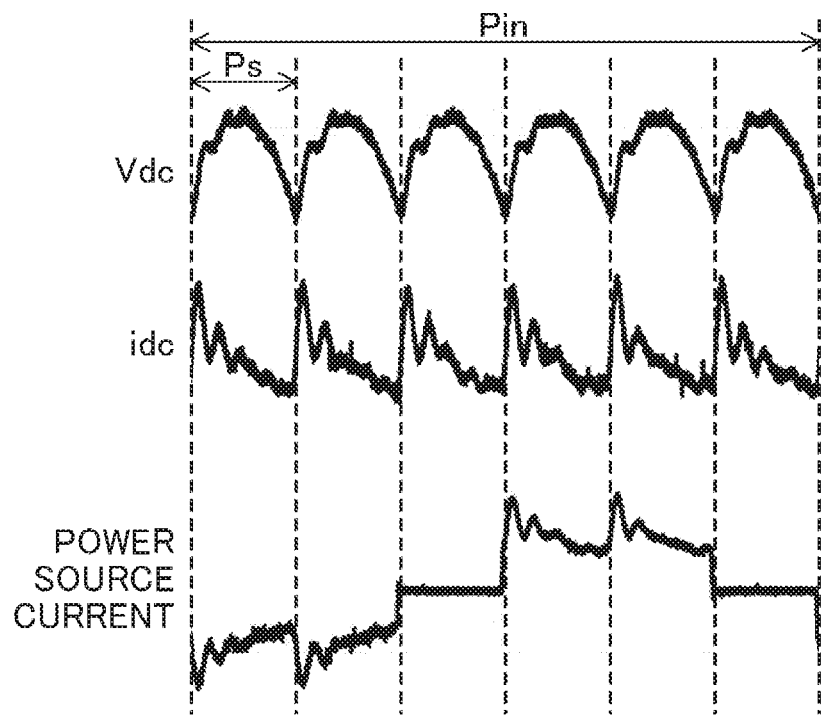
FIG. 8 is a waveform diagram illustrating an example of the waveforms of a DC voltage, an input current, and a power source current in a comparative example of the power conversion device.

FIG. 8 illustrates the waveforms of a DC voltage (Vdc), an input current (idc), and a power source current in the comparative example of the power conversion device. As illustrated in FIG. 8, in the modification example of the power conversion device, only compensation of a manipulated variable based on an indicator value (i.e., proportional control) is performed. Thus, an offset occurs in the proportional control. Because of the offset, a portion in which a distortion of the waveform is not sufficiently reduced remains in the input current (idc). As a result, a portion in which a distortion of the waveform is not sufficiently reduced remains also in the power source current.

Figure 9:
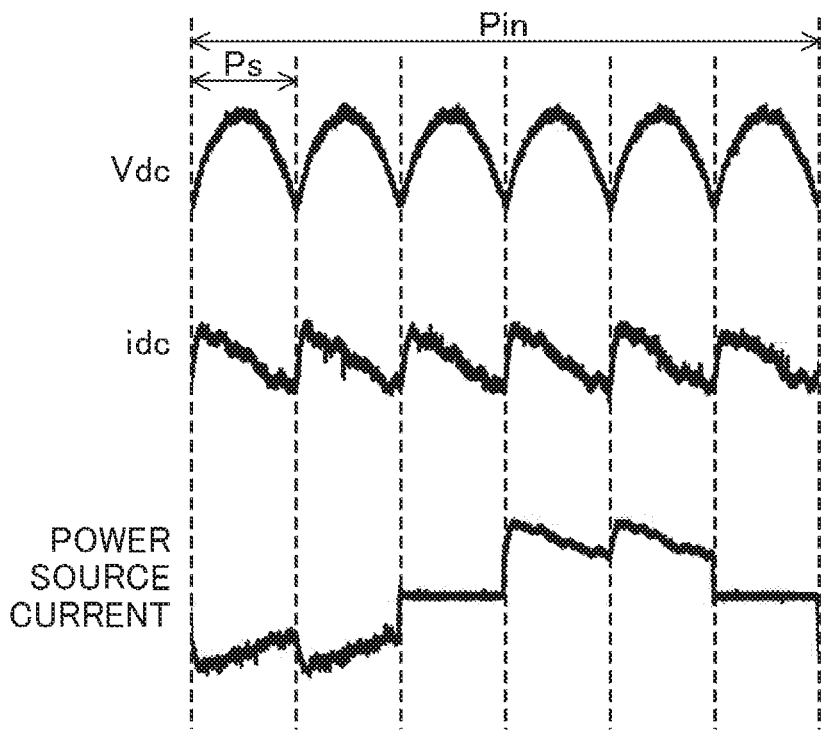
FIG. 9 is a waveform diagram illustrating an example of the waveforms of a DC voltage, an input current, and a power source current in the power conversion device according to Embodiment 1.

FIG. 9 illustrates the waveforms of a DC voltage (Vdc), an input current (idc), and a power source current in the power conversion device (10) according to Embodiment 1, As illustrated in FIG. 9, in the power conversion device (10) according to Embodiment 1, not only compensation of a manipulated variable based on an indicator value (i.e., proportional control) but also control of a manipulated variable based on the integral of the indicator value (i.e., integral control) is performed. Thus, a deviation between the input current (idc) and an ideal value of the input current (idc) can be made close to zero at each storage phase angle (θs). Accordingly, a distortion of the input current (idc) can be reduced for each storage phase angle (θs), and a distortion of the power source current can be reduced for each storage phase angle (θs).

Advantages of Embodiment 1

As described above, as a result of compensating a manipulated variable of control of a switching operation in the inverter circuit (13) in accordance with at least the frequency component closest to the resonant frequency (fLC) of the DC unit (12) among the plurality of frequency components that are included in variations in an indicator value and that correspond to integral multiples of the power source frequency (fp) of the AC power source (20), it is possible to reduce a frequency component causing a disturbance that distorts the input current (idc) (in particular, at least the frequency component closest to the resonant frequency (fLC) of the DC unit (12) among the plurality of frequency components corresponding to integral multiples of the power source frequency (fp)). Accordingly, a distortion of the input current (idc) can be sufficiently reduced.

Specifically, as a result of performing an operation of compensating a manipulated variable (in this example, the voltage amplitude command value (r1*)) of control of a switching operation in the inverter circuit (13) on the basis of the integral of the indicator value stored for each storage phase angle (θs) (in this example, the integral of the reactor voltage (VL)) (i.e., integral control), a deviation between the input current (idc) and an ideal value of the input current (idc) can be made close to zero for each storage phase angle (θs). Accordingly, the frequency component causing a disturbance that distorts the input current can be reduced, and thus a distortion of the input current (idc) can be sufficiently reduced.

In a case where the AC power source (20) is a three-phase AC power source, the period of a disturbance that distorts the input current (idc) corresponds to a period that is ⅙ of the power source period (Pin) of the AC power source (20). Thus, as a result of setting the storage period (Ps) to a period corresponding to an integral multiple of ⅙ of the power source period (Pin) of the AC power source (20), it is possible to accurately compute, for each storage phase angle (θs), the integral of the indicator value correlated with a disturbance that distorts the input current (idc). Accordingly, a compensation operation performed in the switching control unit (70) (i.e., an operation of compensating a manipulated variable of control of a switching operation in the inverter circuit (13)) can be accurately performed.

In addition, in this example, the switching control unit (70) is configured to perform an operation of compensating a manipulated variable of control of a switching operation in the inverter circuit (13) on the basis of the integral of the indicator value stored for each storage phase angle (θs) in the first storage processing unit (200) and indicator value acquired for each storage phase angle (θs) (i.e., proportional-integral control). With this configuration, the responsivity of a compensation operation performed in the switching control unit (70) (i.e., an operation of compensating a manipulated variable of control of a switching operation in the inverter circuit (13)) can be improved, and thus a distortion of the input current (idc) can be quickly reduced.

(Modification Example of Embodiment 1)

Figure 10:
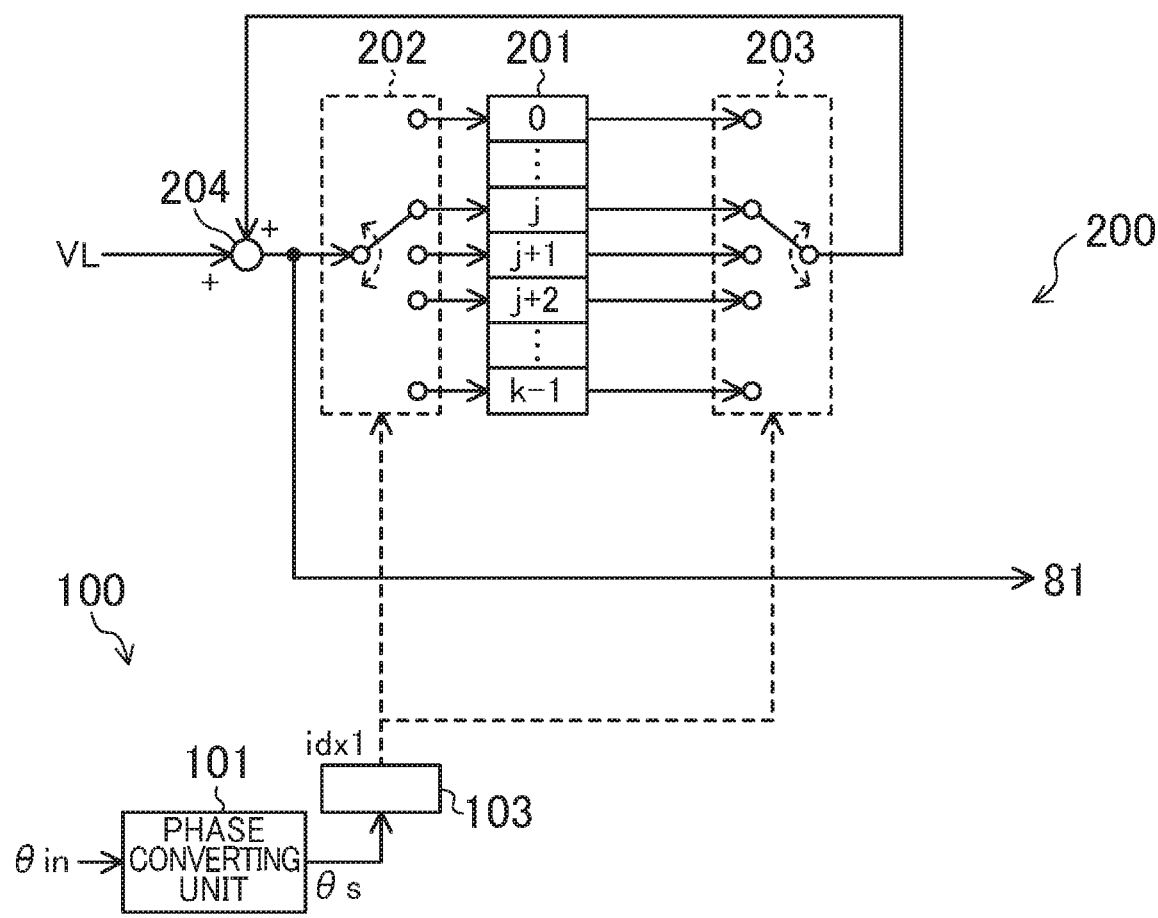
FIG. 10 is a block diagram illustrating an example of the configuration of an indicator value processing unit in a power conversion device according to a modification example of Embodiment 1.

FIG. 10 illustrates an example of the configuration of the first storage processing unit (200) in the power conversion device (10) according to a modification example of Embodiment 1. In this first storage processing unit (200), the phase computing unit (102), the output index generating unit (104), and the first output selecting unit (205) illustrated in FIG. 3 are omitted. In this first storage processing unit (200), an output of the adder (204) is supplied to the switching control unit (70) (specifically, the first compensation amount computing unit (81)).

Also in the case of the above-described configuration, advantages similar to the advantages of the power conversion device (10) according to Embodiment 1 can be acquired.

Embodiment 2

The power conversion device (10) according to Embodiment 2 is different from the power conversion device (10) according to Embodiment 1 in terms of the configuration of the first storage processing unit (200). Other than that, the configuration of the power conversion device (10) according to Embodiment 2 is similar to the configuration of the power conversion device (10) according to Embodiment 1.

<First Storage Processing Unit>

In the power conversion device (10) according to Embodiment 2, the first storage processing unit (200) is configured to, for each storage phase angle (θs), add an indicator value acquired at the storage phase angle (θs) and a value acquired by multiplying the integral of the indicator value stored in the first storage processing unit (200) (the integral of the indicator value at the storage phase angle (θs)) by a positive coefficient smaller than 1, and update the integral of the indicator value stored in the first storage processing unit (200) (the integral of the indicator value at the storage phase angle (θs)) to a value acquired through the addition.

Figure 11:
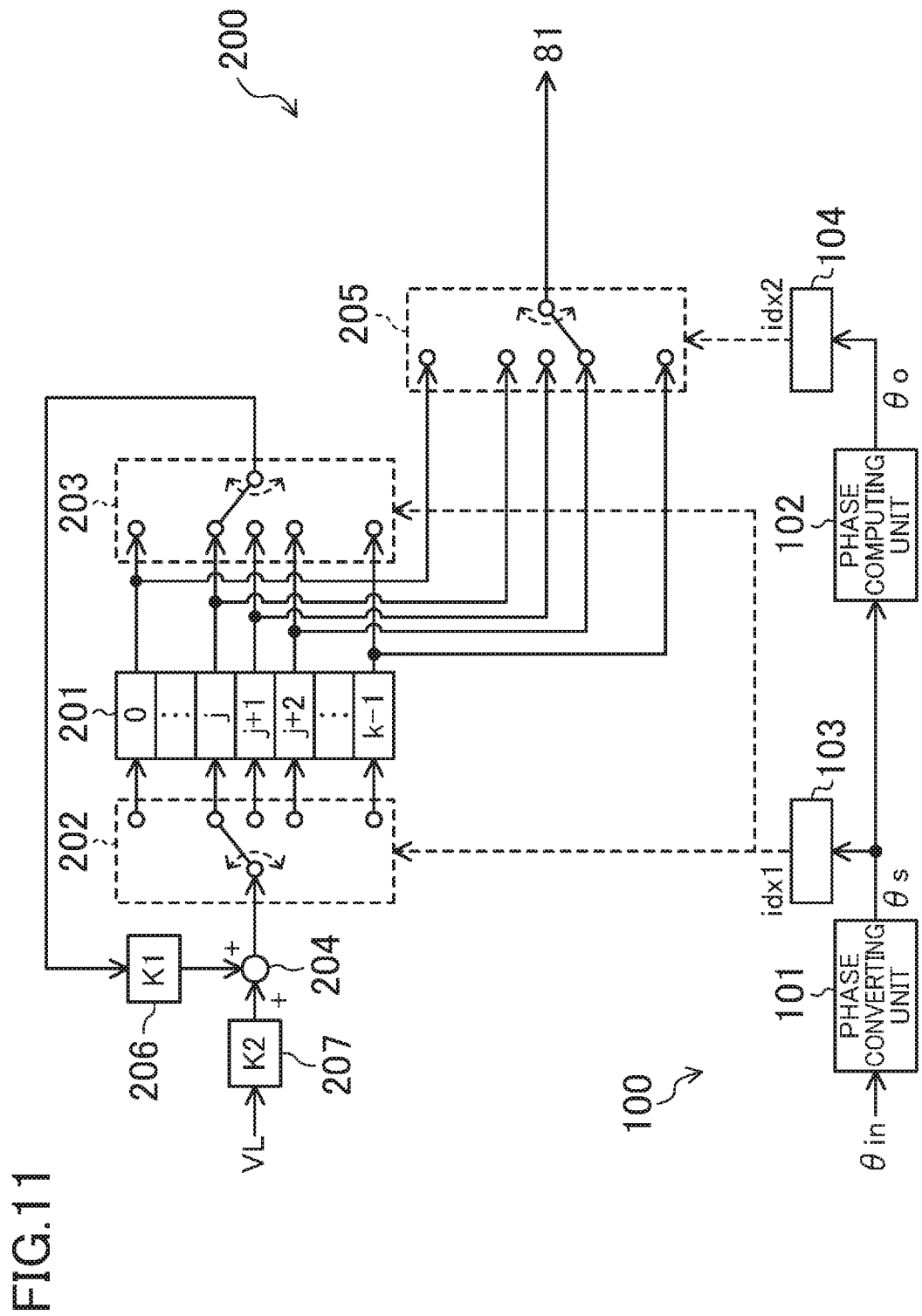
FIG. 11 is a block diagram illustrating an example of the configuration of an indicator value processing unit in a power conversion device according to Embodiment 2.

As illustrated in FIG. 11, the first storage processing unit (200) according to Embodiment 2 includes a first correcting unit (206) and a second correcting unit (207) in addition to the components of the first storage processing unit (200) according to Embodiment 1 illustrated in FIG. 3.

The first correcting unit (206) is configured to multiply the integral of the j-th indicator value (in this example, the integral of the reactor voltage (VL)) read out by the integral selecting unit (203) by a predetermined first correction coefficient. The second correcting unit (207) is configured to multiply an indicator value (in this example, the reactor voltage (VL)) input thereto by a predetermined second correction coefficient. The first correction coefficient is set to a positive value smaller than 1, and the second correction coefficient is set to a certain positive value.

The adder (204) adds an output of the first correcting unit (206) (i.e., the integral of the indicator value multiplied by the first correction coefficient) and an output of the second correcting unit (207) (i.e., the indicator value multiplied by the second correction coefficient). That is, the adder (204) performs weighted addition of the indicator value input thereto and the integral of the j-th indicator value. An output of the adder (204) (i.e., a new integral of the indicator value) is stored in the j-th storage region selected by the first input selecting unit (202) among the k storage regions in the first storage unit (201). Accordingly, the integral of the indicator value stored in the j-th storage region selected by the first input selecting unit (202) among the k storage regions of the first storage unit (201) (i.e., the integral of the indicator value at the j-th storage phase angle (θs)) is updated.

Advantages of Embodiment 2

As a result of configuring the first storage processing unit (200) in the above-described manner, it is possible to update the integral of the indicator value stored for each storage phase angle (θs) such that variation in the integral of the indicator value with respect to variation in the indicator value stored for each storage phase angle (θs) is reduced (i.e., such that the integral of the indicator value is quickly stabilized). Accordingly, the stability of a compensation operation performed in the switching control unit (70) (i.e., an operation of compensating a manipulated variable of control of a switching operation in the inverter circuit (13)) can be improved.

The first correcting unit (206) may be configured to change the first correction coefficient in accordance with the storage phase angle (θs). For example, the first correcting unit (206) may be configured to change the first correction coefficient in accordance with the storage phase angle (θs) such that the first correction coefficient increases at the storage phase angle (θs) at which a disturbance that distorts the input current (idc) is relatively large and that the first correction coefficient decreases at the storage phase angle (θs) at which a disturbance that distorts the input current (idc) is relatively small. With this configuration, the stability of a compensation operation performed in the switching control unit (70) can be further improved.

(Modification Example 1 of Embodiment 2)

Figure 12:
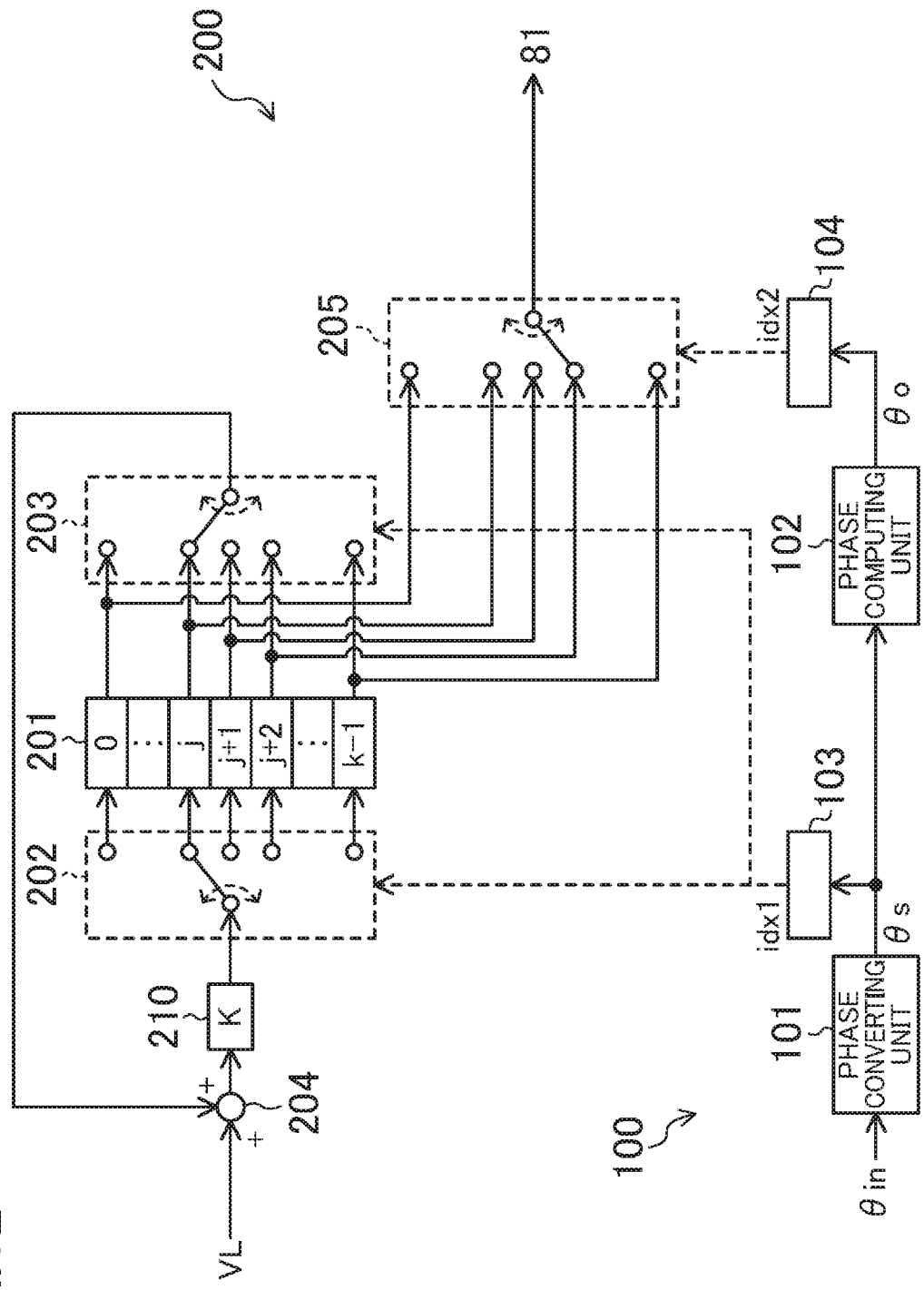
FIG. 12 is a block diagram illustrating an example of the configuration of an indicator value processing unit in a power conversion device according to Modification example 1 of Embodiment 2.

FIG. 12 illustrates an example of the configuration of the first storage processing unit (200) in the power conversion device (10) according to Modification example 1 of Embodiment 2. This first storage processing unit (200) is configured to, for each storage phase angle (θs), add an indicator value acquired at the storage phase angle (θs) and the integral of the indicator value stored in the first storage processing unit (200) (the integral of the indicator value at the storage phase angle (θs)), and update the integral of the indicator value stored in the first storage processing unit (200) (the integral of the indicator value at the storage phase angle (θs)) to a value acquired by multiplying a value acquired through the addition by a positive coefficient smaller than 1.

As illustrated in FIG. 12, this first storage processing unit (200) includes a correcting unit (210) instead of the first correcting unit (206) and the second correcting unit (207) illustrated in FIG. 11. Other than that, the configuration of the first storage processing unit (200) according to Modification example 1 of Embodiment 2 is similar to the configuration of the first storage processing unit (200) according to Embodiment 2.

The correcting unit (210) is configured to multiply an output of the adder (204) by a predetermined correction coefficient. The correction coefficient is set to a positive value smaller than 1. An output of the correcting unit (210) (i.e., a new integral of the indicator value) is stored in the j-th storage region selected by the first input selecting unit (202) among the k storage regions of the first storage unit (201). Accordingly, the integral of the indicator value stored in the j-th storage region selected, by the first input selecting unit (202) among the k storage regions of the first storage unit (201) (i.e., the integral of the indicator value at the j-th storage phase angle ($\theta$s)) is updated.

Advantages of Modification Example 1 of Embodiment 2

In Modification example 1 of Embodiment 2, the integral of the indicator value can be prevented from diverging, and thus the stability of a compensation operation performed in the switching control unit (70) (i.e., an operation of compensating a manipulated variable of control of a switching operation in the inverter circuit (13)) can be improved.

The correcting unit (210) may be configured to change the correction coefficient in accordance with the storage phase angle ($\theta$s). For example, the correcting unit (210) may be configured to change the correction coefficient in accordance with the storage phase angle ($\theta$s) such that the correction coefficient increases at the storage phase angle ($\theta$s) at which a disturbance that distorts the input current (idc) is relatively large and that the correction coefficient decreases at the storage phase angle ($\theta$s) at which a disturbance that distorts the input current (idc) is relatively small. With this configuration, the stability of a compensation operation performed in the switching control unit (70) can be further improved.
(Modification Example 2 of Embodiment 2)

Figure 13:
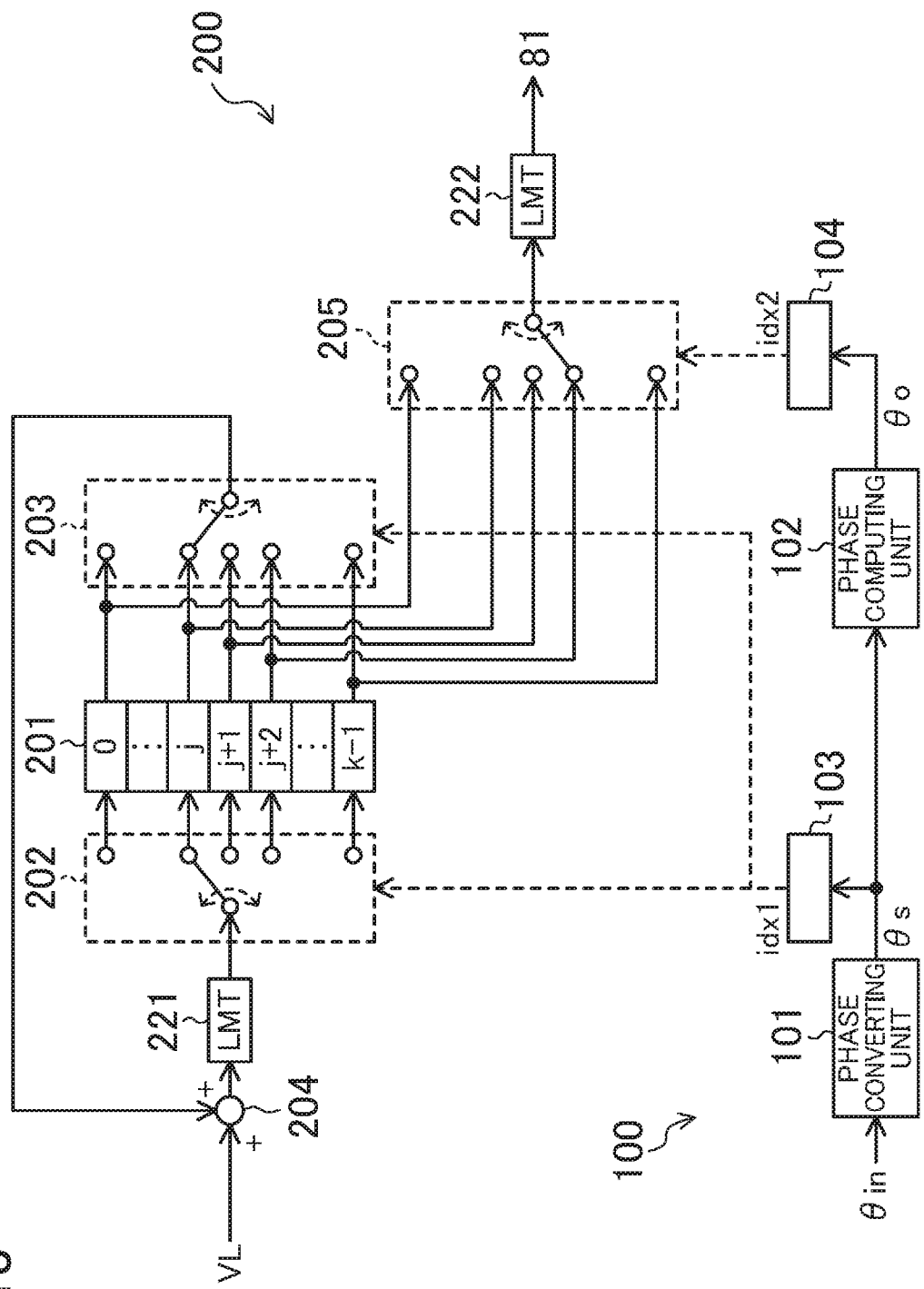
FIG. 13 is a block diagram illustrating an example of the configuration of an indicator value processing unit in a power conversion device according to Modification example 2 of Embodiment 2.

FIG. 13 illustrates an example of the configuration of the first storage processing unit (200) in the power conversion device (10) according to Modification example 2 of Embodiment 2. This first storage processing unit (200) includes a first limiter (221) and a second limiter (222) instead of the first correcting unit (206) and the second correcting unit (207) illustrated in FIG. 11. Other than that, the configuration of the first storage processing unit (200) according to Modification example 2 of Embodiment 2 is similar to the configuration of the first storage processing unit (200) according to Embodiment 2.

The first limiter (221) limits an output of the adder (204) such that the output of the adder (204) (i.e., an integral of an indicator value) does not exceed a predetermined first upper-limit value. Specifically, in a case where an output of the adder (204) does not exceed the first upper-limit value, the first limiter (221) allows the output of the adder (204) to pass therethrough without limiting the output. In a case where the output of the adder (204) exceeds the first upper-limit value, the first limiter (221) outputs the first upper-limit value instead of the output of the adder (204). The output of the first limiter (221) is supplied to the first input selecting unit (202).

The second limiter (222) limits an output of the first output selecting unit (205) such that the output of the first output selecting unit (205) (i.e., an output of the first storage processing unit (200)) does not exceed a predetermined second upper-limit value. Specifically, in a case where an output of the first output selecting unit (205) does not exceed the second upper-limit value, the second limiter (222) allows the output of the first output selecting unit (205) to pass therethrough without limiting the output. In a case where the output of the first output selecting unit (205) exceeds the second upper-limit value, the second limiter (222) outputs the second upper-limit value instead of the output of the first output selecting unit (205). The output of the second limiter (222) is supplied to the switching control unit (70) (specifically, the first compensation amount computing unit (81)).

Advantages of Modification Example 2 of Embodiment 2

In Modification example 2 of Embodiment 2, the integral of the indicator value can be prevented from diverging, and thus the stability of a compensation operation performed in the switching control unit (70) (i.e., an operation of compensating a manipulated variable of control of a switching operation in the inverter circuit (13)) can be improved.

Embodiment 3

The power conversion device (10) according to Embodiment 3 is different from the power conversion device (10) according to Embodiment 1 in terms of the configuration of the indicator value processing unit (60). Other than that, the configuration of the power conversion device (10) according to Embodiment 3 is similar to the configuration of the power conversion device (10) according to Embodiment 1.
[Indicator Value Processing Unit]

Figure 14:
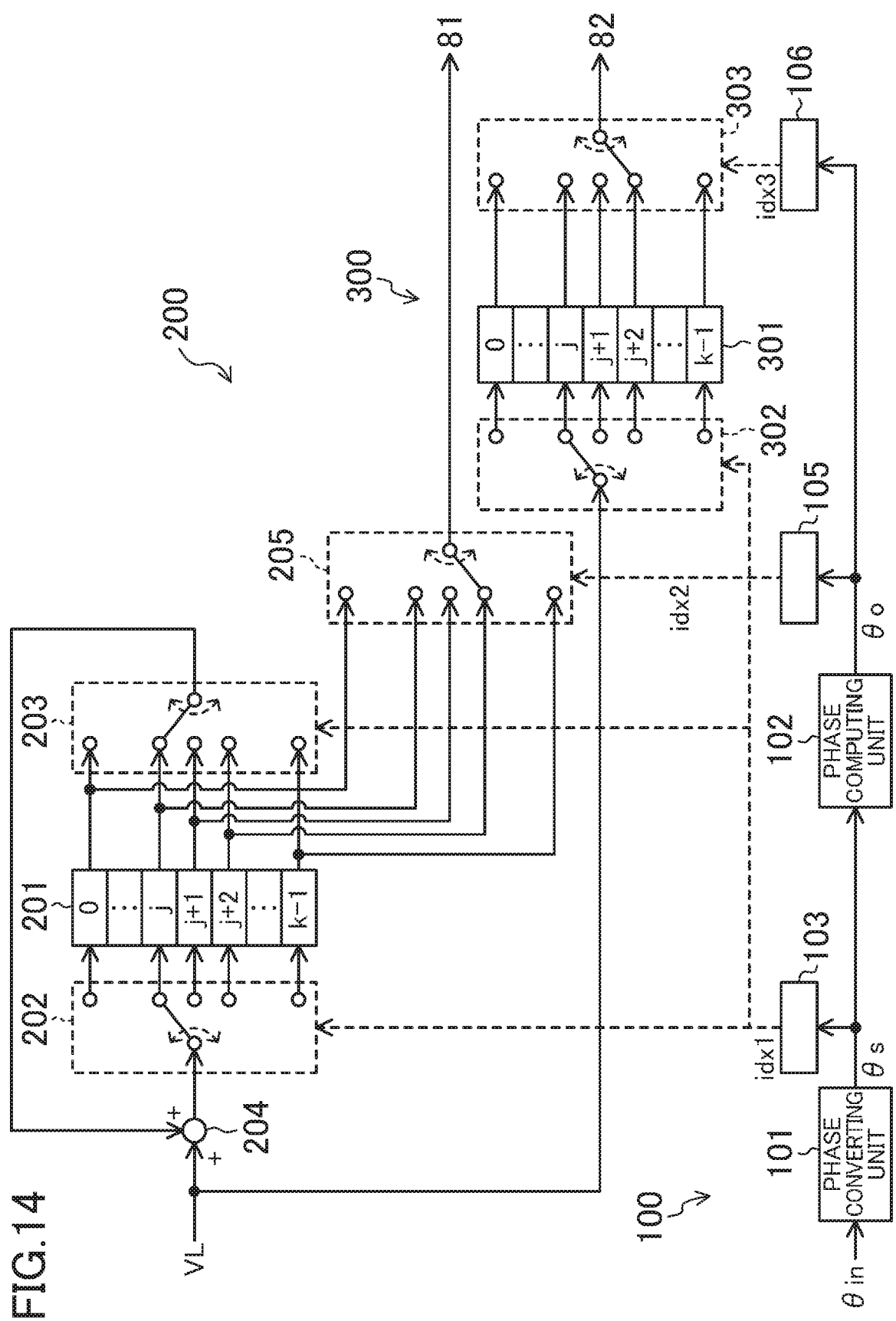
FIG. 14 is a block diagram illustrating an example of the configuration of an indicator value processing unit in a power conversion device according to Embodiment 3.

As illustrated in FIG. 14, the indicator value processing unit (60) according to Embodiment 3 includes a second storage processing unit (300) in addition to the components of the indicator value processing unit (60) according to Embodiment 1 illustrated in FIG. 3. In addition, the timing control unit (100) according to Embodiment 3 includes a first output index generating unit (105) and a second output index generating unit (106) instead of the output index generating unit (104) illustrated in FIG. 3.
<Second Storage Processing Unit>

The second storage processing unit (300) is configured to, for each of storage phase angles ($\theta$s) predetermined in the storage period (Ps), perform an operation of storing an indicator value at the storage phase angle ($\theta$s) (a storage operation). In this storage operation, k indicator values respectively corresponding to k storage phase angles ($\theta$s) predetermined in the storage period (Ps) are stored in the second storage processing unit (300).

In this example, the second storage processing unit (300) is configured to, for each storage phase angle ($\theta$s), update the indicator value stored in the second storage processing unit (300) (the indicator value at the storage phase angle ($\theta$s)) to an indicator value acquired at the storage phase angle ($\theta$s).

In addition, the second storage processing unit (300) is configured to perform an operation of sequentially outputting the indicator values stored for the individual storage phase angles ($\theta$s) (an output operation). Specifically, the second storage processing unit (300) outputs, for each of output phase angles ($\theta$o) predetermined in an output period, the indicator value corresponding to the output phase angle ($\theta$o) among the indicator values stored for the individual storage phase angles ($\theta$s). In this output operation, for each of k output phase angles ($\theta$o) predetermined in the output period, the indicator value corresponding to the output phase angle ($\theta$o) among the k indicator values stored in the second storage processing unit (300) (the k indicator values respectively corresponding to the k storage phase angles (θs)) is output.

In this example, the storage period (Ps) and output period of the second storage processing unit (300) are identical to the storage period (Ps) and output period of the first storage processing unit (200). In addition, the k storage phase angles (θs) predetermined in the storage period (Ps) of the second storage processing unit (300) are identical to the k storage phase angles (θs) predetermined in the storage period (Ps) of the first storage processing unit (200), and the k output phase angles (θo) predetermined in the output period of the second storage processing unit (300) are identical to the k output phase angles (θo) predetermined in the Output period of the first storage processing unit (200).

<Configuration of Timing Control Unit>

The first output index generating unit (105) is configured to generate an output index (idx2) on the basis of the output phase angle (θo) acquired by the phase computing unit (102), like the output index generating unit (104) illustrated in FIG. 3.

The second output index generating unit (106) generates an output index (idx3) on the basis of the output phase angle (θo) acquired by the phase computing unit (102). Like the output index (idx2), the output index (idx3) indicates the number corresponding to the storage region to be selected from among the k storage regions, which will be described below. The number of the output index (idx3) is any one of integers from 0 to k−1.

Specifically, the second output index generating unit (106) sets the number of the output index (idx3) to "j" when the output phase angle acquired by the phase computing unit (102) (the output phase angle (θo) in the output period) becomes the j-th output phase angle (θo) among the k output phase angles (θo) predetermined in the output period. In this example, the j-th output phase angle (θo) among the k output phase angles (θo) in the output period is "(2π/k)×j". The number of the output index (idx3) is "θo/(2π/k)".

In this example, the number of the output index (idx2) generated by the first output index generating unit (105) is identical to the number of the output index (idx3) generated by the second output index generating unit (106).

<Configuration of Second Storage Processing Unit>

As illustrated in FIG. 14, the second storage processing unit (300) includes a second storage unit (301), a second input selecting unit (302), and a second output selecting unit (303).

<<Second Storage Unit>>

The second storage unit (301) includes k storage regions respectively corresponding to the predetermined k storage phase angles (θs). The k indicator values corresponding to the k storage phase angles (θs) are respectively stored in the k storage regions of the second storage unit (301). Specifically, the indicator value at the j-th storage phase angle (θs) is stored in the j-th storage region of the second storage unit (301).

<<Second Input Selecting Unit>>

The second input selecting unit (302) is configured to select any one of the k storage regions of the second storage unit (301) on the basis of the input index (idx1) generated by the input index generating unit (103). In the storage region selected by the second input selecting unit (302), an indicator value that has been input (in this example, the reactor voltage (VL)) is stored.

<<Second Output Selecting Unit>>

The second output selecting unit (303) is configured to select any one of the k storage regions of the second storage unit (301) on the basis of the output index (idx3) generated by the second output index generating unit (106), and read out and output the indicator value stored in the storage region. In this example, the indicator value output from the second storage processing unit (300) is input to the second compensation amount computing unit (82) of the compensating unit (80) illustrated in FIG. 2.

<Switching Control Unit>

In addition, in the power conversion device (10) according to Embodiment 3, the switching control unit (70) compensates a manipulated variable of control of a switching operation in the inverter circuit (13) on the basis of the integrals of the indicator values stored for the individual storage phase angles (θs) in the first storage processing unit (200) and the indicator values stored for the individual storage phase angles (θs) in the second storage processing unit (300). That is, in the power conversion device (10) according to Embodiment 3, the following update operation is performed by the switching control unit (70) in each storage period (Ps).

First, in response to start of the j-th update operation by the switching control unit (70) in the m-th storage period (Ps), the input index (idx1) becomes "j". Accordingly, in the first storage processing unit (200), the integral of the j-th indicator value stored in the j-th storage region of the first storage unit (201) (the integral of the indicator value at the j-th storage phase angle (θs)) is updated. In addition, in the second storage processing unit (300), the j-th indicator value stored in the j-th storage region of the second storage unit (301) (the indicator value at the j-th storage phase angle (θs)) is updated.

In addition, in response to start of the j-th update operation by the switching control unit (70) in the m-th storage period (Ps), an acquisition operation is started in the switching control unit (70). In this acquisition operation, information that is necessary to derive a control manipulated variable is acquired.

In response to completion of the acquisition operation in the j-th update operation by the switching control unit (70), a derivation operation is started in the switching control unit (70). In this derivation operation, a control manipulated variable is derived on the basis of the information acquired in the acquisition operation.

In response to completion of the derivation operation in the j-th update operation by the switching control unit (70), a compensation operation is started in the switching control unit (70). In response to start of the compensation operation in the j-th update operation by the switching control unit (70), the output phase angle (θo) in the output period becomes the predetermined j-th output phase angle (θo), and the output index (idx2) becomes "j". Accordingly, in the first storage processing unit (200), the integral of the j-th indicator value stored in the j-th storage region of the first storage unit (201) (i.e., the integral ($j_{(m)}$) of the indicator value at the j-th storage phase angle (θs) updated in the in-th storage period (Ps)) is output to the switching control unit (70). Also, the output index (idx3) becomes "j". Accordingly, in the second storage processing unit (300), the j-th indicator value stored in the j-th storage region of the second storage unit (301) (i.e., the indicator value at the j-th storage phase angle (θs) updated in the m-th storage period (Ps)) is output to the switching control unit (70).

On the other hand, in the compensation operation in the j-th update operation by the switching control unit (70), the control manipulated variable derived in the derivation operation is compensated on the basis of the output of the indicator value processing unit (60) (i.e., the integral of the indicator value at the j-th storage phase angle (θs) and the indicator value at the j-th storage phase angle (θs)). Specifically, the first compensation amount computing unit (81) derives a first compensation amount (rc1*) on the basis of the integral of the indicator value output from the first storage processing unit (200), the second compensation amount computing unit (82) derives a second compensation amount (rc2*) on the basis of the indicator value output from the second storage processing unit (300), and the adder (83) adds the first compensation amount (rc1*) and the second compensation amount (rc2*) to derive a compensation amount (rc*). The compensation processing unit (84) adds the voltage amplitude command value (r1*) derived in the derivation operation and the compensation amount (rc*) to derive a compensated voltage amplitude command value (r2*). In this way, the control manipulated variable is compensated, and the compensated control manipulated variable (in this example, the compensated voltage amplitude command value (r2*)) is acquired.

In response to completion of the compensation operation in the j-th update operation by the switching control unit (70), a generation operation is performed in the switching control unit (70). In this generation operation, an output of the switching control unit (70) is generated on the basis of the compensated control manipulated variable acquired in the compensation operation.

As described above, in the compensation operation in the j-th update operation performed by the switching control unit (70) in the m-th storage period (Ps), the control manipulated variable is compensated by using the integral of the indicator value at the j-th storage phase angle (θs) corresponding to the j-th update operation by the switching control unit (70) (specifically, the integral $(j_{(m)})$ of the indicator value at the j-th storage phase angle (θs) updated in the m-th storage period (Ps)) and the indicator value at the j-th storage phase angle (θs) (specifically, the indicator value at the j-th storage phase angle (θs) updated in the m-th storage period (Ps)).

Advantages of Embodiment 3

As described above, as a result of performing an operation of compensating a manipulated variable of control of a switching operation in the inverter circuit (13) on the basis of the integrals of indicator values stored for the individual storage phase angles (θs) and the indicator values stored for the individual storage phase angles (θs) (i.e., proportional-integral control), it is possible to improve the responsivity of a compensation operation performed in the switching control unit (70) (i.e., an operation of compensating a manipulated variable of control of a switching operation in the inverter circuit (13)). Accordingly, a distortion of the input current (idc) can be quickly reduced.

Embodiment 4

The power conversion device (10) according to Embodiment 4 is different from the power conversion device (10) according to Embodiment 1 in terms of the configuration of the first storage processing unit (200). Other than that, the configuration of the power conversion device (10) according to Embodiment 4 is similar to the configuration of the power conversion device (10) according to Embodiment 1.

<First Storage Processing Unit>

Figure 15:
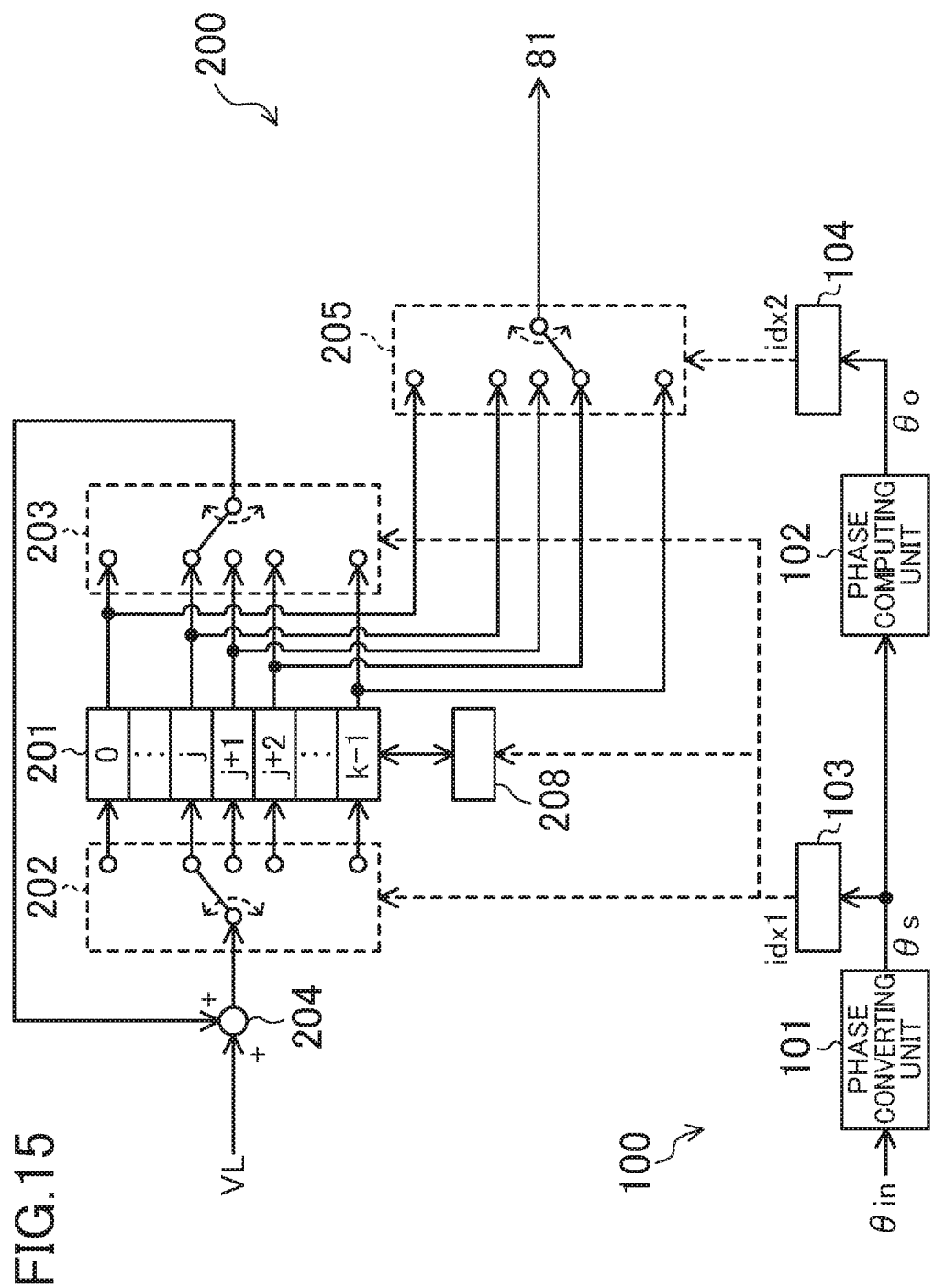
FIG. 15 is a block diagram illustrating an example of the configuration of an indicator value processing unit in a power conversion device according to Embodiment 4.

In the power conversion device (10) according to Embodiment 4, the first storage processing unit (200) is configured to interpolate, on the basis of at least the integrals of two indicator values among the integrals of the indicator values stored for the individual storage phase angles (θs) in the first storage processing unit (200), the integral of the indicator value corresponding to a storage phase angle (θs) between two storage phase angles (θs) respectively corresponding to the integrals of the two indicator As illustrated in FIG. 15, the first storage processing unit (200) according to Embodiment 4 includes an interpolating unit (208) in addition to the components of the first storage processing unit (200) according to Embodiment 1 illustrated in FIG. 3.

<<Interpolating Unit>>

The interpolating unit (208) is configured to interpolate, on the basis of at least the integrals of two indicator values among the integrals of the k indicator values respectively stored in the k storage regions of the first storage unit (201), the integral of the indicator value corresponding to a storage phase angle (θs) between two storage phase angles (θs) respectively corresponding to the integrals of the two indicator values.

For example, the interpolating unit (208) selects the j-th storage region and the j+2-th storage region among the k storage regions of the first storage unit (201), and reads out the integral of the j-th indicator value and the integral of the j+2-th indicator value respectively stored in the selected j-th storage region and j+2-th storage region. In addition, on the basis of the integral of the j-th indicator value and the integral of the j+2-th indicator value that have been read out (i.e., the integral of the indicator value at the j-th storage phase angle (θs) and the integral of the indicator value at the j+2-th storage phase angle (θs)), the interpolating unit (208) derives the integral of the j+1-th indicator value corresponding to the j+1-th storage phase angle (θs) between the j-th storage phase angle (θs) and the j+2-th storage phase angle (θs). For example, the interpolating unit (208) averages the integral of the j-th indicator value and the integral of the j+2-th indicator value to derive the integral of the j+1-th indicator value. Subsequently, the interpolating unit (208) stores the derived integral of the j+1-th indicator value (i.e., the integral of the indicator value at the j+1-th storage phase angle (θs)) in the storage region corresponding to the j+1-th storage phase angle (θs) among the k storage regions of the first storage unit (201). Accordingly, the integral of the j+1-th indicator value stored in the j+1-th storage region is updated.

[Storage Operation by First Storage Processing Unit]

Figure 16:
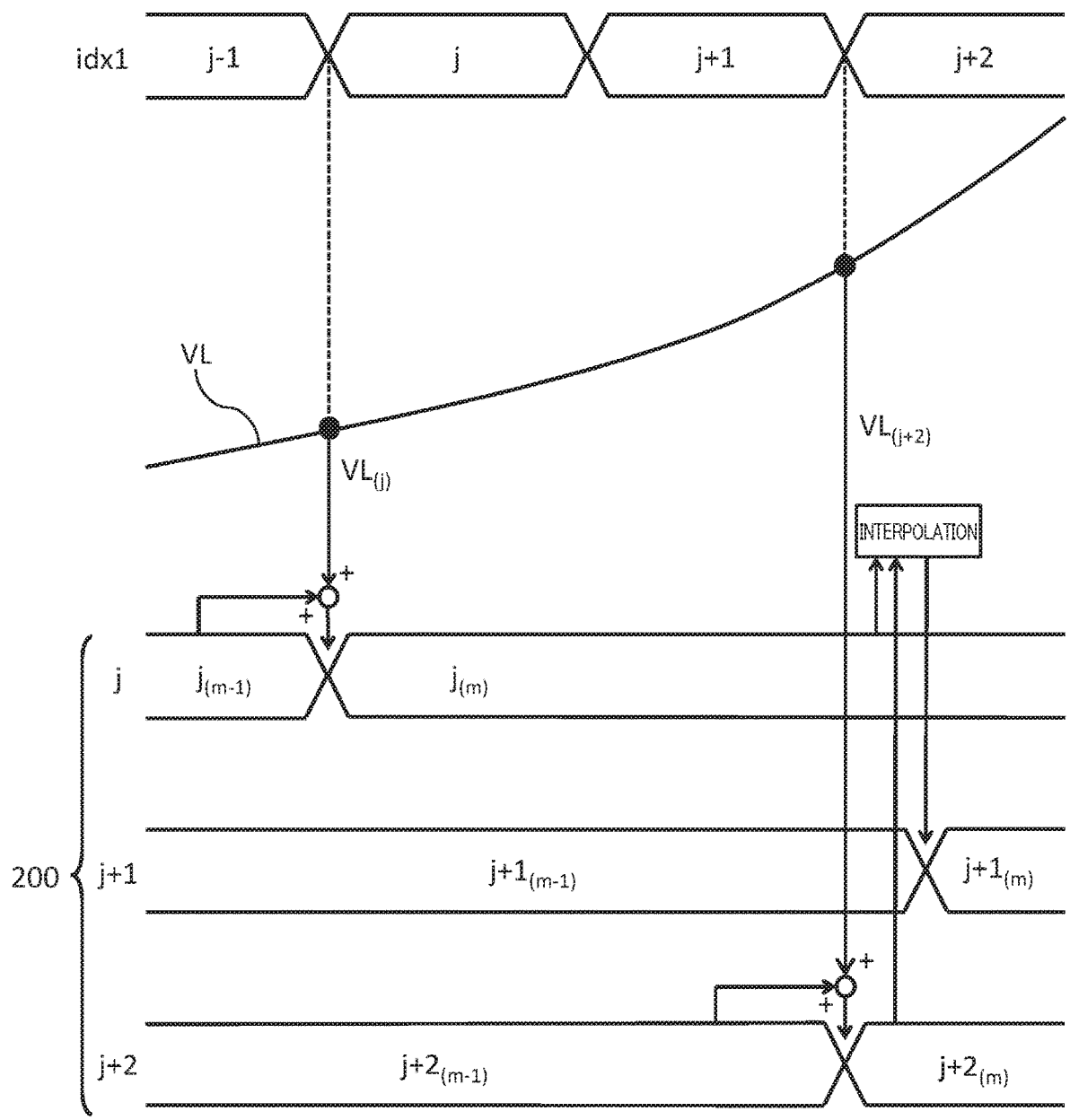
FIG. 16 is a timing chart for describing a storage operation by a first storage processing unit according to Embodiment 4.

Next, the storage operation by the first storage processing unit (200) according to Embodiment 4 will be described in detail with reference to FIG. 16. FIG. 16 illustrates changes in the number of the input index (idx1), the reactor voltage (VL), and the values stored in the first storage processing unit (200) (the integrals of the k indicator values) in the m-th storage period (Ps). In FIG. 16, the reactor voltage (VL) is used as an indicator value as an example. In addition, in the example in FIG. 16, the indicator value (in this example, the reactor voltage (VL)) is acquired at the j-th storage phase angle (θs) and the j+2-th storage phase angle (θs) among the k storage phase angles (θs) predetermined in the storage period (Ps), hut the indicator value is t acquired at the j+1-th storage phase angle (θs).

As illustrated in FIG. 16, in the m-th storage period (Ps), when the storage phase angle (θs) becomes the predetermined j-th storage phase angle (θs), the number of the input index (idx1) becomes "j". In addition, the reactor voltage (VL) at the j-th storage phase angle (θs) is acquired. Subsequently, in the first storage processing unit (200), the integral of the j-th reactor voltage (VL) stored in the j-th storage region is updated, Subsequently, in the m-th storage period (Ps), when the storage phase angle (θs) becomes the predetermined j+1-th storage phase angle (θs), the number of the input index (idx1) becomes "j+1". At this time, the reactor voltage (VL) at the j+1-th storage phase angle (θs) is not acquired, and the integral of the j+1-th reactor voltage (VL) stored in the j+1-th storage region of the first storage unit (201) is not updated in the first storage processing unit (200).

Subsequently, in the m-th storage period (Ps), when the storage phase angle (θs) becomes the predetermined j+2-th storage phase angle (θs), the number of the input index (idx1) becomes "j+2". In addition, the reactor voltage (VL) at the j+2-th storage phase angle (θs) is acquired. Subsequently, in the first storage processing unit (200), the integral of the j+2-th reactor voltage (VL) stored in the j+2-th storage region of the first storage unit (201) is updated.

Subsequently, in response to completion of update of the integral of the j-th reactor voltage (VL) stored in the j-th storage region of the first storage unit (201) and completion of update of the integral of the j+2-th reactor voltage (VL) stored in the j+2-th storage region of the first storage unit (201), the integral of the j-th reactor voltage (VL) stored in the j-th storage region of the first storage unit (201) and the integral of the j+2-th reactor voltage (VL) stored in the j+2-th storage region of the first storage unit (201) are read out in the first storage processing unit (200). Subsequently, the integral of the j+1-th reactor voltage (VL) is interpolated on the basis of the integral of the j-th reactor voltage (VL) and the integral of the j+2-th reactor voltage (VL), and the integral of the j+1-th reactor voltage (VL) newly acquired through the interpolation is stored in the j+1-th storage region of the first storage unit (201). Accordingly, the integral of the j+1-th reactor voltage (VL) stored in the j+1-th storage region of the first storage unit (201) is updated. For example, the integral of the j-th reactor voltage (VL) is represented by "$j_{(m)}$", the integral of the j+2-th reactor voltage (VL) is represented by "$j+2_{(m)}$", and the integral of the j+1-th reactor voltage (VL) newly acquired through the interpolation is represented by "$j+1_{(m)}$", and then $j+1_{(m)}=(j_{(m)}+j+2_{(m)})/2$ holds.

The foregoing operation is repeatedly performed in each storage period (Ps), and the integral of the indicator value (in this example, the reactor voltage (VL)) stored for each storage phase angle (θs) is updated in each storage period (Ps).

Advantages of Embodiment 4

As described above, as a result of interpolating, on the basis of at least the integrals of two indicator values among the integrals of indicator values stored for the individual storage phase angles (θs) in the first storage processing unit (200), the integral of the indicator value corresponding to a storage phase angle (θs) between two storage phase angles (θs) respectively corresponding to the integrals of the two indicator values, it is possible to update the integral of the indicator value at the storage phase angle (θs) for which the indicator value is not acquired among the k storage phase angles (θs) predetermined in the storage period (Ps).

Embodiment 5

The power conversion device (10) according to Embodiment 5 is different from the power conversion device (10) according to Embodiment 1 in terms of the configuration of the indicator value processing unit (60). Other than that, the configuration of the power conversion device (10) according to Embodiment 5 is similar to the configuration of the power conversion device (10) according to Embodiment 1.

[Indicator Value Processing Unit]

Figure 17:
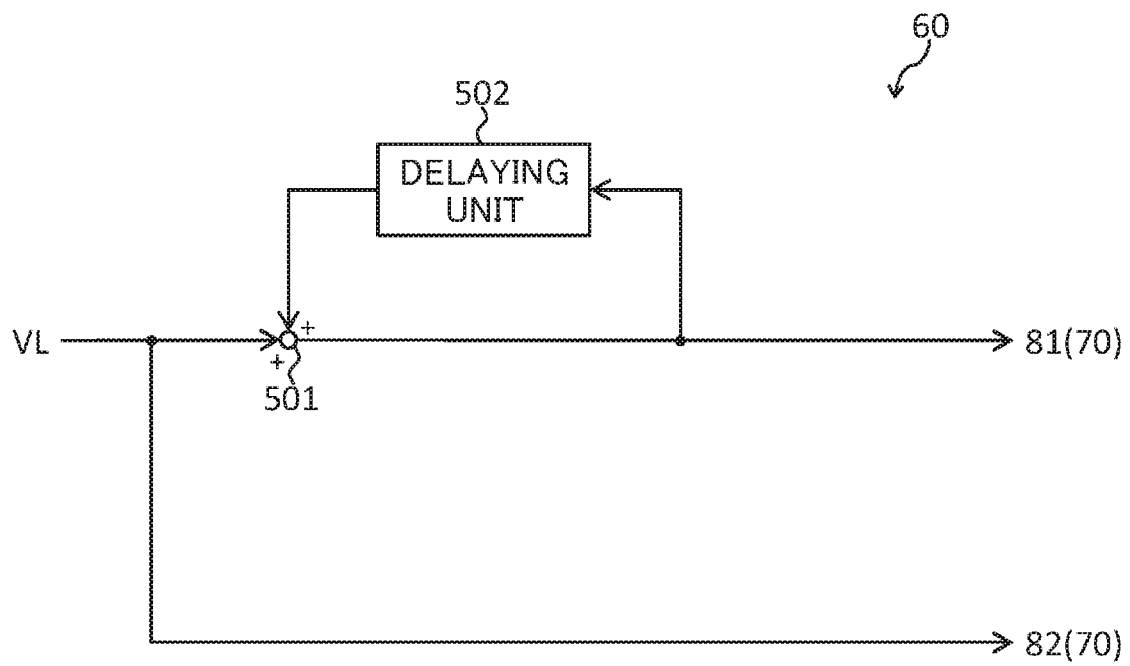
FIG. 17 is a block diagram illustrating an example of the configuration of an indicator value processing unit in a power conversion device according to Embodiment 5.

As illustrated in FIG. 17, the indicator value processing unit (60) according to Embodiment 5 includes an adding unit (501) and a delaying unit (502). The adding unit (501) adds an indicator value input thereto and an output of the delaying unit (502). The delaying unit (502) delays an output of the adding unit (501) by a delay time corresponding to an integral submultiple of the power source period (Pin) of the AC power source (20). In this example, the output of the adding unit (501) is supplied to the switching control unit (70) (specifically, the first compensation amount computing unit (81)). In this example, the delay time in the delaying unit (502) is set to, for example, ⅙ of the power source period (Pin) of the AC power source (20), which is a three-phase AC power source,

[Switching Control Unit]

The switching control unit (70) compensates a manipulated variable of control of a switching operation in the inverter circuit (13) on the basis of the output of the adding unit (501) (i.e., the integral of the indicator value).

Advantages of Embodiment 5

As described above, as a result of adding an indicator value input to the adding unit (501) and an output of the delaying unit (502), it is possible to perform an operation of compensating a manipulated variable of control of a switching operation in the inverter circuit (13) on the basis of the integral of the indicator value (i.e., integral control). Accordingly, a deviation between the input current (idc) and an ideal value of the input current (idc) can be made close to zero, and thus a frequency component causing a disturbance that distorts the input current can be reduced. As a result, a distortion of the input current (idc) can be sufficiently reduced.

Embodiment 6

The power conversion device (10) according to Embodiment 6 is different from the power conversion device (10) according to Embodiment 1 in terms of the configuration of the indicator value processing unit (60). Other than that, the configuration of the power conversion device (10) according to Embodiment 6 is similar to the configuration of the power conversion device (10) according to Embodiment 1.

[Indicator Value Processing Units]

Figure 18:
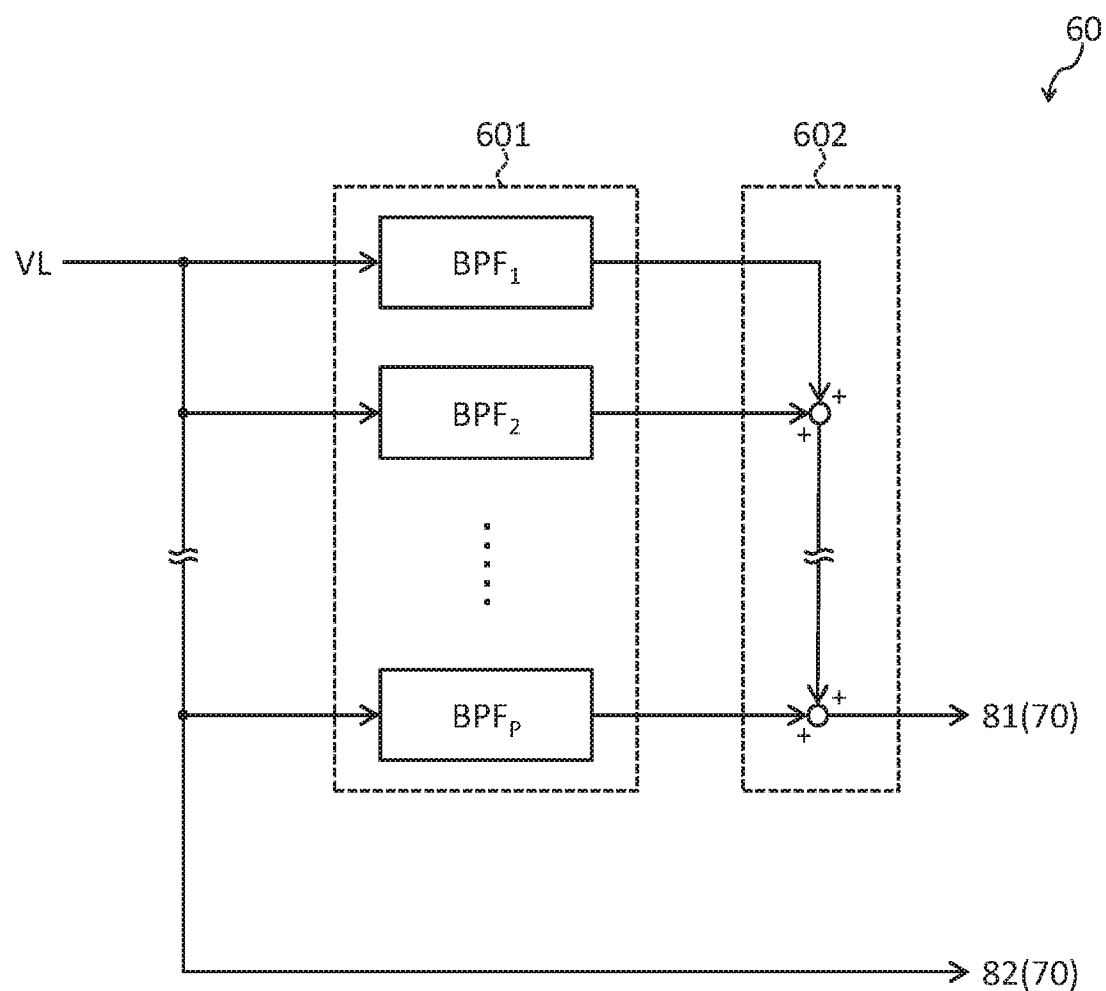
FIG. 18 is a block diagram illustrating an example of the configuration of an indicator value processing unit in a power conversion device according to Embodiment 6.

As illustrated in FIG. 18, the indicator value processing unit (60) according to Embodiment 6 includes a frequency component extracting unit (601) and a combining unit (602). The frequency component extracting unit (601) extracts at least the frequency component closest to the resonant frequency (fLC) of the DC unit (12) among the plurality of frequency components that are included in variations in an indicator value and that correspond to integral multiples of the power source frequency (fp) of the AC power source (20).

In this example, the frequency component extracting unit (601) includes p (p is an integer greater than or equal to 1) band-pass filters ($BPF_1$ to $BPF_p$).

The passbands of the p band-pass filters ($BPF_1$ to $BPF_p$) are each set to a frequency band including a frequency that is an integral multiple of the power source frequency (fp) of the AC power source (20). Specifically, the passband of the first band-pass filter (BPF$_1$) is set to a frequency band including a frequency that is identical to the power source frequency (fp) of the AC power source (20), the passband of the second band-pass filter (BPF$_2$) is set to a frequency band including a frequency that is twice the power source frequency (fp) of the AC power source (20), and the passband of the p-th band-pass filter (BPF$_p$) is set to a frequency band including a frequency that is p times the power source frequency (fp) of the AC power source (20).

The combining unit (602) combines the frequency components extracted by the frequency component extracting unit (601). In this example, the combining unit (602) includes p−1 adders that add outputs of the p band-pass filters (BPF$_1$ to BPF$_p$). An output of the combining unit (602) is supplied to the switching control unit (70) (specifically, the first compensation amount computing unit (81)).

[Switching Control Unit]

The switching control unit (70) compensates a manipulated variable of control of a switching operation in the inverter circuit (13) on the basis of the output of the combining unit (602) (i.e., the frequency components extracted by the frequency component extracting unit (601)).

Advantages of Embodiment 6

As described above, as a result of compensating a manipulated variable of control of a switching operation in the inverter circuit (13) on the basis of the frequency component extracted by the frequency component extracting unit (601), it is possible to reduce a frequency component causing a disturbance that distorts the input current (idc) (in particular, the frequency component closest to the resonant frequency (fLC) of the DC unit (12) among the plurality of frequency components corresponding to integral multiples of the power source frequency (fp) of the AC power source (20)). Accordingly, a distortion of the input current (idc) can be sufficiently reduced.

The gains of the p band-pass filters (BPF$_1$ to BPF$_p$) may be set to gains identical to each other or may be set to gains different from each other. For example, the gains of the p band-pass filters (BPF$_1$ to BPF$_p$) may be set such that the gain of the band-pass filter having a passband including the frequency closest to the resonant frequency (fLC) of the DC unit (12) among the frequencies that are integral multiples of the power source frequency (fp) of the AC power source (20) is the largest. Such settings make it possible to effectively reduce a frequency component causing a disturbance that distorts the input current (idc) (in particular, the frequency component closest to the resonant frequency (fLC) of the DC unit (12) among the plurality of frequency components corresponding to integral multiples of the power source frequency (fp) of the AC power source (20)).

Embodiment 7

The power conversion device (10) according to Embodiment 7 is different from the power conversion device (10) according to Embodiment 1 in terms of the configuration of the indicator value processing unit (60). Other than that, the configuration of the power conversion device (10) according to Embodiment 7 is similar to the configuration of the power conversion device (10) according to Embodiment 1.

[Indicator Value Processing Unit]

Figure 19:
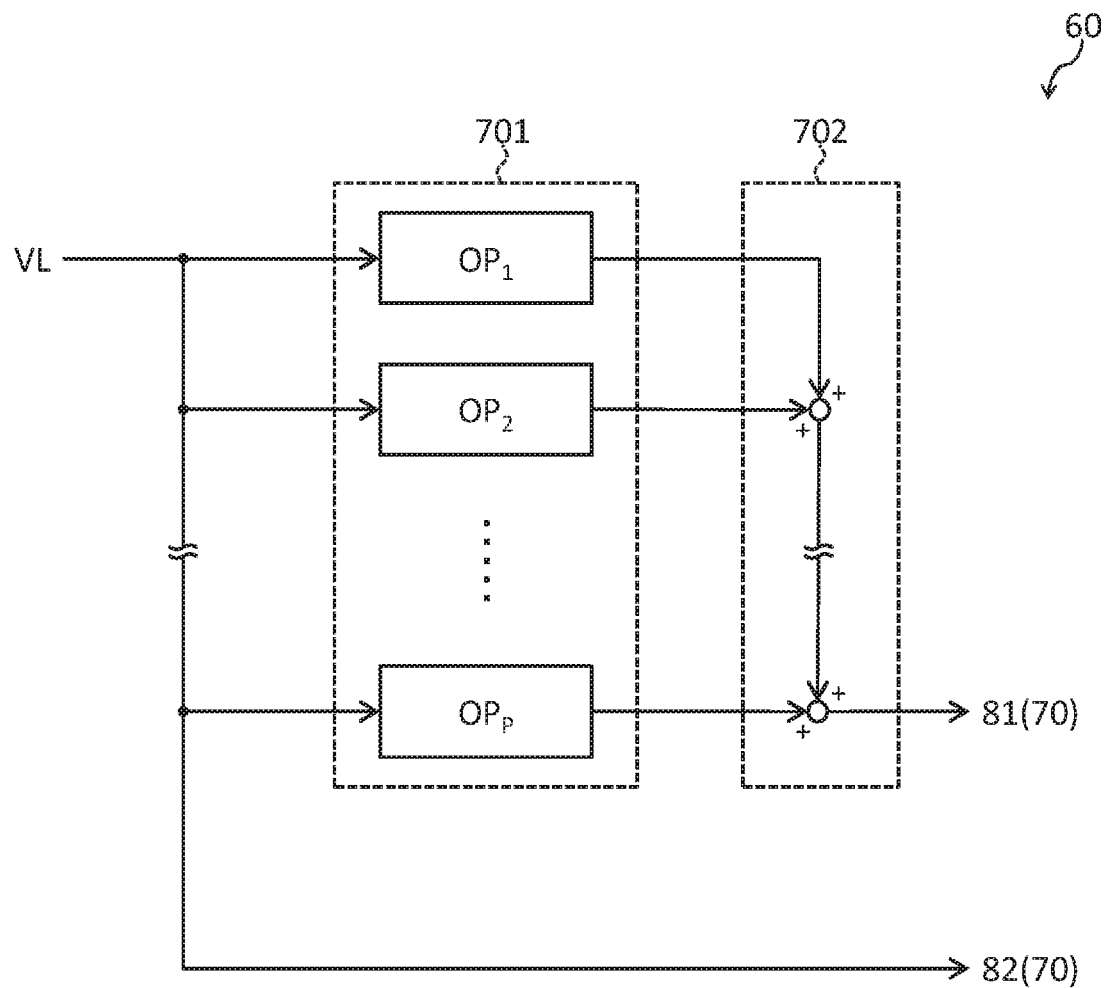
FIG. 19 is a block diagram illustrating an example of the configuration of an indicator value processing unit in a power conversion device according to Embodiment 7.

As illustrated in FIG. 19, the indicator value processing unit (60) according to Embodiment 7 includes a Fourier operation processing unit (701) and a combining unit (702). The Fourier operation processing unit (701) performs Fourier transform on an indicator value, thereby acquiring an operation result about at least the frequency component closest to the resonant frequency (fLC) of the DC unit (12) among the plurality of frequency components that are included in variations in the indicator value and that correspond to integral multiples of the power source frequency (fp) of the AC power source (20). In this example, the Fourier operation processing unit (701) includes p operation units (OP$_1$ to OP$_p$). The configurations of the operation units (OP$_1$ to OP$_p$) will be described in detail below. The combining unit (702) combines operation results of the Fourier operation processing unit (701). In this example, the combining unit (702) includes p−1 adders. An output of the combining unit (702) is supplied to the switching control unit (70) (specifically, the first compensation amount computing unit (81)).

[Switching Control Unit]

The switching control unit (70) compensates a manipulated variable of control of a switching operation in the inverter circuit (13) on the basis of the output of the combining unit (702) (i.e., the operation result of the Fourier operation processing unit (701)).

[Configuration of Operation Unit]

Figure 20:
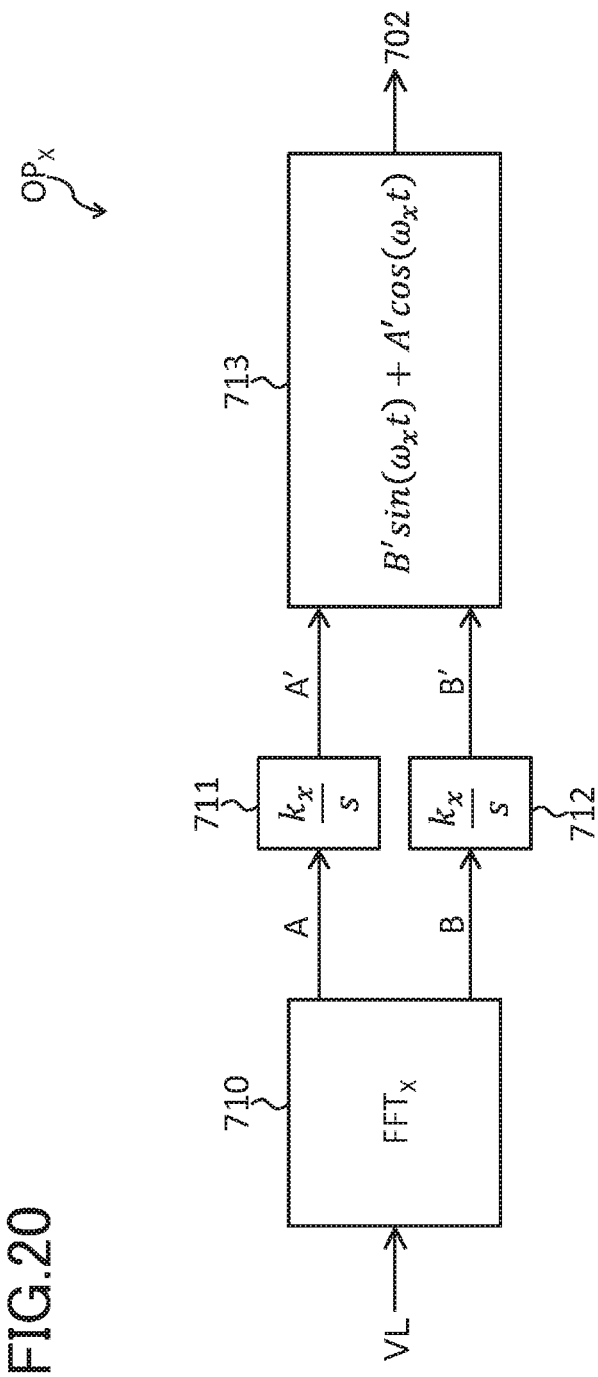
FIG. 20 is a block diagram illustrating an example of the configuration of an operation unit according to Embodiment 7.

FIG. 20 illustrates an example of the configuration of the operation units (OP$_1$ to OP$_p$). FIG. 20 illustrates an example of the configuration of the X-th (X is an integer greater than or equal to 1 and smaller than or equal to p) operation unit (OP$_X$) as a representative example of the operation units (OP$_1$ to OP$_p$). The operation unit (Op$_X$) includes a Fourier transformer (710), a first integrator (711), a second integrator (712), and a sine wave generating unit (713). The operation units (OP$_1$ to OP$_p$) are each assigned a frequency that is an integral multiple of the power source frequency (fp) of the AC power source (20). Specifically, the first operation unit (OP$_1$) is assigned a frequency that is identical to the power source frequency (fp) of the AC power source (20), the second operation unit (OP$_2$) is assigned a frequency that is twice the power source frequency (fp) of the AC power source (20), and the p-th operation unit (OP$_p$) is assigned a frequency that is p times the power source frequency (fp) of the AC power source (20). In addition, the operation units (OP$_1$ to OP$_p$) are each assigned a weighting coefficient.

The Fourier transformer (710) performs Fourier transform on an indicator value, thereby obtaining a cosine amplitude (A) and a sine amplitude (B) about the frequency assigned to the X-th operation unit (OP$_X$). When the frequency assigned to the X-th operation unit (OP$_X$) is represented by "ω", the cosine amplitude (A) and the sine amplitude (B) are expressed by the following expressions 1 and 2.

[Math. 1]

$$A(\omega)=\int_{-\infty}^{\infty}f(t)\cos\omega t\,dt \quad (1)$$

[Math. 2]

$$B(\omega)=\int_{-\infty}^{\infty}f(t)\sin\omega t\,dt \quad (1)$$

The first integrator (711) integrates the cosine amplitude (A) obtained by the Fourier transformer (710) and multiplies the integral of the cosine amplitude (A) obtained through the integration by a weighting coefficient (k$_X$) assigned to the X-th operation unit (OP$_X$), thereby obtaining a cosine amplitude integral (A'). The second integrator (712) integrates the sine amplitude (B) obtained by the Fourier transformer (710)

and multiplies the integral of the sine amplitude (B) obtained through the integration by the weighting coefficient ($k_X$) assigned to the X-th operation unit ($OP_X$), thereby obtaining a sine amplitude integral (B'). The sine wave generating unit (713) generates a sine wave on the basis of the cosine amplitude integral (A') obtained by the first integrator (711) and the sine amplitude integral (B') obtained by the second integrator (712). An output of the sine wave generating unit (713) is supplied to the combining unit (702). The output (sine wave) of the sine wave generating unit (713) is expressed by the following expression 3.

[Math. 3]

$$B' \sin(\omega \times t) + A' \cos(\omega \times t) \qquad (3)$$

Advantages of Embodiment 7

As described above, as a result of compensating a manipulated variable of control of a switching operation in the inverter circuit (13) on the basis of the operation result acquired by the Fourier operation processing unit (701), it is possible to reduce a frequency component causing a disturbance that distorts the input current (idc) (in particular, the frequency component closest to the resonant frequency (fLC) of the DC unit (12) among the plurality of frequency components corresponding to integral multiples of the power source frequency (fp) of the AC power source (20)). Accordingly, a distortion of the input current (idc) can be sufficiently reduced.

The weighting coefficients assigned to the operation units ($OP_1$ to $OP_p$) may be weighting coefficients identical to each other or may be weighting coefficients different from each other. For example, weighting coefficients may be set to the operation units ($OP_1$ to $OP_p$) such that the weighting coefficient assigned to the operation unit assigned with the frequency closest to the resonant frequency (fLC) of the DC unit (12) among the frequencies that are integral multiples of the power source frequency (fp) of the AC power source (20) is the largest. Such settings make it possible to effectively reduce a frequency component causing a disturbance that distorts the input current (idc) (in particular, the frequency component closest to the resonant frequency (fLC) of the DC unit (12) among the plurality of frequency components corresponding to integral multiples of the power source frequency (fp) of the AC power source (20)).

[Modification Example Of Operation Unit]

Figure 21:
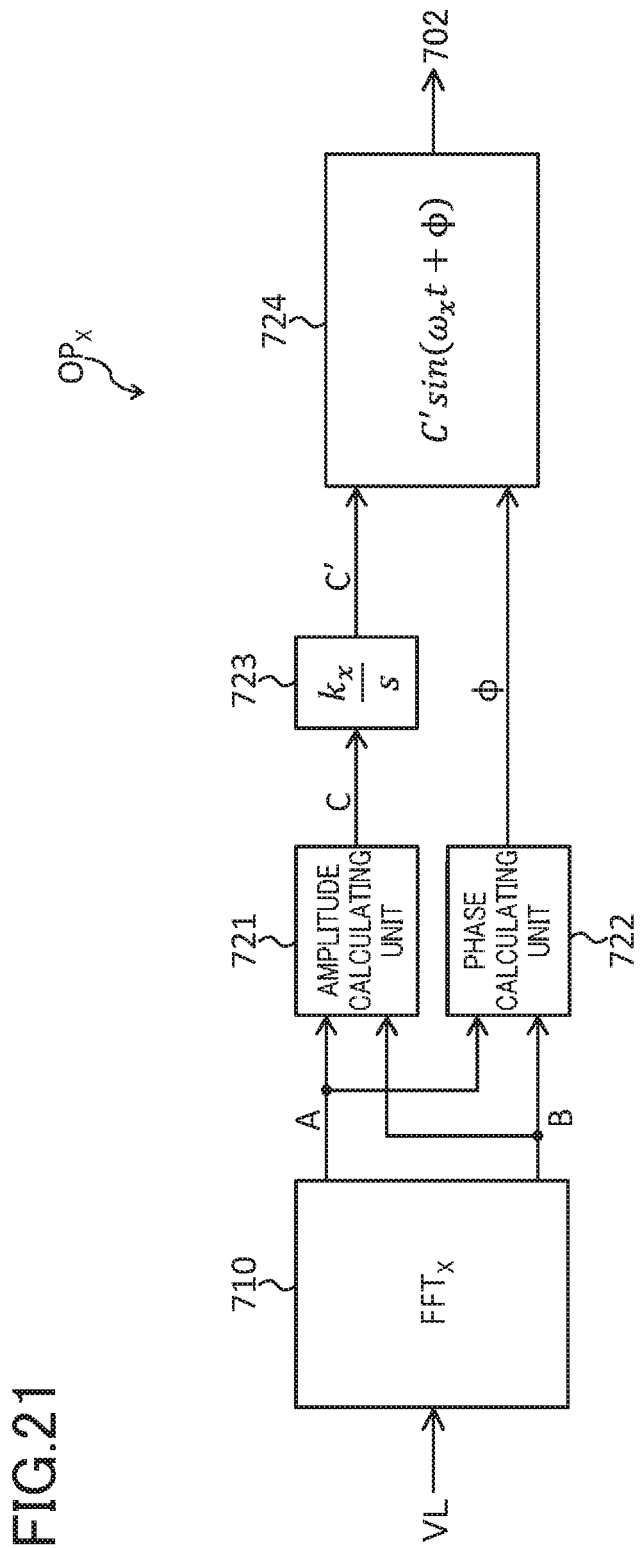
FIG. 21 is a block diagram illustrating an example of a modification example of the operation unit according to Embodiment 7.

The operation units ($OP_1$ to $OP_p$) may have the configuration illustrated in FIG. 21. FIG. 21 illustrates an example of the configuration of the X-th operation unit ($OP_X$) as a representative example of the operation units ($OP_1$ to $OP_p$). In the example in FIG. 21, the X-th operation unit ($OP_X$) includes the Fourier transformer (710), an amplitude calculating unit (721), a phase calculating unit (722), an integrator (723), and a sine wave generating unit (724).

The amplitude calculating unit (721) obtains an amplitude (C) on the basis of the cosine amplitude (A) and the sine amplitude (B) obtained by the Fourier transformer (710). The phase calculating unit (722) obtains a phase (φ) on the basis of the cosine amplitude (A) and the sine amplitude (B) obtained by the Fourier transformer (710). The integrator (723) integrates the amplitude (C) obtained by the amplitude calculating unit (721), and multiplies the integral of the amplitude (C) obtained through the integration by the weighting coefficient ($k_X$) assigned to the X-th operation unit ($OP_X$), thereby obtaining an amplitude integral (C'). The sine wave generating unit (724) generates a sine wave on the basis of the amplitude integral (C') obtained by the integrator (723) and the phase (φ) obtained by the phase calculating unit (722). An output of the sine wave generating unit (724) is supplied to the combining unit (702). The output (sine wave) of the sine wave generating unit (724) is expressed by the following expression 4.

[Math. 4]

$$C' \sin(\omega \times t + \phi) \qquad (4)$$

Embodiment 8

The power conversion device (10) according to Embodiment 8 is different from the power conversion device (10) according to Embodiment 1 in terms of the configuration of the compensating unit (80) of the switching control unit (70). Other than that, the configuration of the power conversion device (10) according to Embodiment 8 is similar to the configuration of the power conversion device (10) according to Embodiment 1.

Figure 22:
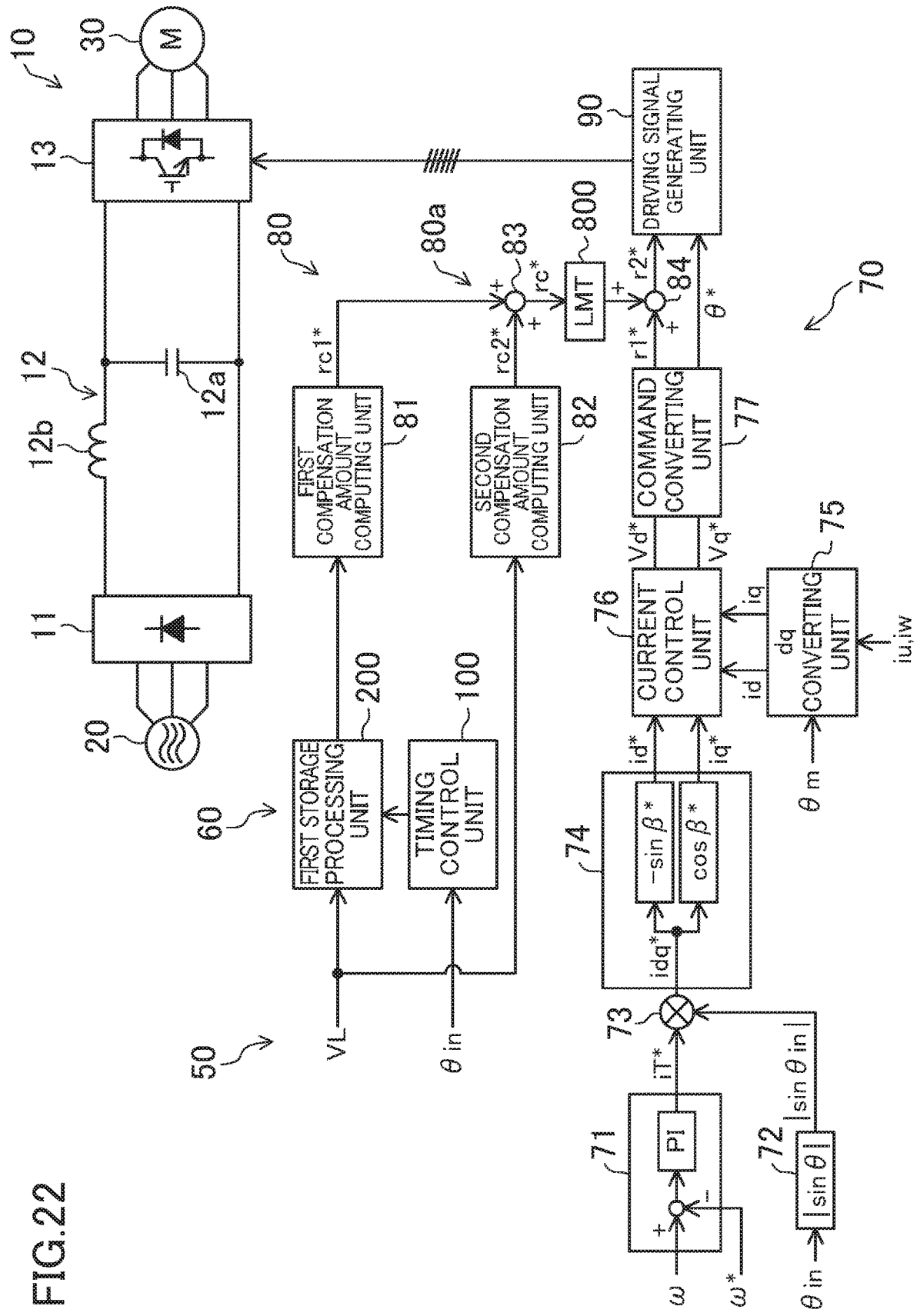
FIG. 22 is a block diagram illustrating an example of the configuration of a controller in a power conversion device according to Embodiment 8.

As illustrated in FIG. 22, the compensating unit (80) according to Embodiment 8 includes a limiter (800) in addition to the components of the compensating unit (80) according to Embodiment 1 illustrated in FIG. 2. The limiter (800) limits an output of the compensation amount computing unit (80a) (i.e., the compensation amount (rc*)) such that the output of the compensation amount computing unit (80a) does not exceed a predetermined upper-limit value. Specifically, in a case where an output of the compensation amount computing unit (80a) does not exceed the upper-limit value, the limiter (800) allows the output of the compensation amount computing unit (80a) to pass therethrough without limiting the output. In a case where the output of the compensation amount computing unit (80a) exceeds the upper-limit value, the limiter (800) outputs the upper-limit value instead of the output of the compensation amount computing unit (80a). The output of the limiter (800) is supplied to the compensation processing unit (84).

Advantages of Embodiment 8

As described above, as a result of limiting the output of the compensation amount computing unit (80a) (i.e., the compensation amount (rc*)) such that the output of the compensation amount computing unit (80a) does not exceed the predetermined upper-limit value, it is possible to prevent the influence of the output of the compensation amount computing unit (80a) with respect to a manipulated variable of control of a switching operation in the inverter circuit (13) from becoming too large. Accordingly, it is possible to prevent a collapse of a switching operation in the inverter circuit (13) caused by an excessive influence of the output of the compensation amount computing unit (80a).

(Modification Example of Embodiment 8)

Figure 23:
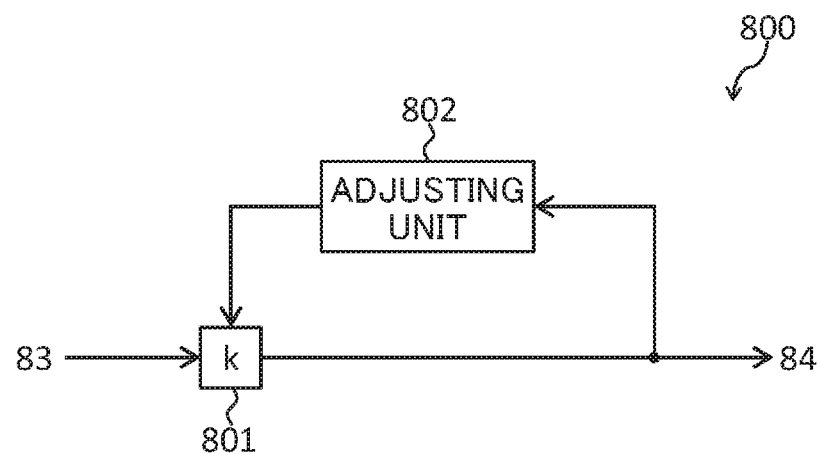
FIG. 23 is a block diagram illustrating an example of a modification example of a limiter according to Embodiment 8.

FIG. 23 illustrates an example of the configuration of the limiter (800) in the power conversion device (10) according to a modification example of Embodiment 8. This limiter (800) includes a multiplying unit (801) and an adjusting unit (802). The multiplying unit (801) multiplies the compensation amount (rc*) derived by the compensation amount computing unit (80a) by a predetermined multiplication coefficient. The adjusting unit (802) adjusts the multiplication coefficient for the multiplying unit (801) such that an output of the multiplying unit (801) is within a predetermined allowable range. Specifically, the adjusting unit (802) decreases the multiplication coefficient for the multiplying unit (801) in a case where the output of the multiplying unit 801) is above the upper-limit value of the allowable range, and decreases the multiplication coefficient for the multiplying unit (801) also in a case where the output of the multiplying unit (801) is below the lower-limit value of the allowable range. In a case where the output of the multiplying unit (801) is within the allowable range, the adjusting unit (802) does not change the multiplication coefficient for the multiplying unit (801). The output of the multiplying unit (801) is supplied to the compensation processing unit (84). The compensation processing unit (84) compensates a manipulated variable of control of a switching operation in the inverter circuit (13) on the basis of the output of the multiplying unit (801).

[Advantages of Modification Example of Embodiment 8]

As described above, as a result of adjusting the multiplication coefficient for the multiplying unit (801) such that the output of the multiplying unit (801) (a compensation amount acquired by multiplying the compensation amount (rc*) derived by the compensation amount computing unit (80a) by a multiplication coefficient) is within the allowable range, it is possible to prevent the influence of the output of the multiplying unit (801) with respect to a manipulated variable of control of a switching operation in the inverter circuit (13) from becoming too large. Accordingly, it is possible to prevent a collapse of a switching operation in the inverter circuit (13) caused by an excessive influence of the output of the multiplying unit (801).

Other Embodiments

In the description given above, the case is described as an example where the indicator value is the reactor voltage (VL). However, the indicator value is not limited thereto. The indicator value may be a deviation between a detection value of the reactor voltage detecting unit (45) (i.e., the reactor voltage (VL)) and a predetermined command value (target value) of the reactor voltage (VL), a deviation between a detection value of the input current detecting unit (46) (i.e., the input current (idc)) and a predetermined command value (target value) of the input current (idc), a deviation between a detection value of the DC voltage detecting unit (47) (i.e., the DC voltage (Vdc)) and a predetermined command value (target value) of the DC voltage (Vdc), or a deviation between the energy of the capacitor (12a) and a predetermined command value (target value) of the energy of the capacitor (12a). The energy of the capacitor (12a) can be calculated on the basis of the DC voltage (Vdc).

In the description given above, the case is described as an example where the AC power source (20) is a three-phase AC power source. However, the AC power source (20) is not limited thereto, and may be a single-phase AC power source. In a case where the AC power source (20) is a single-phase AC power source, the period of a disturbance that distorts the input current (idc) (for example, a disturbance of a repeating waveform such as a resonance phenomenon (LC resonance) that occurs in the DC unit (12)) corresponds to a period that is ½ of the power source period (Pin) of the AC power source (20). Thus, in a case where the AC power source (20) is a single-phase AC power source, it is preferable that the storage period (Ps) be set to a period corresponding to an integral multiple of ½ of the power source period (Pin) of the AC power source (20) (specifically, a period that is ½ of the power source period (Pin) of the AC power source (20)). This setting enables the integral of an indicator value correlated with a disturbance that distorts the input current (idc) to be accurately computed for each storage phase angle (θs), and thus a compensation operation in the switching control unit (70) (i.e., an operation of compensating a manipulated variable of control of a switching operation in the inverter circuit (13)) can be accurately performed. In addition, in a case where the AC power source (20) is a single-phase AC power source, the update period of the switching control unit (70) may be set to, for example, a period that is 1/(2×k) of the power source period (Pin) of the AC power source (20), which is a single-phase AC power source. In this case, an update operation is performed (2×k) times during one power source period (Pin). In addition, in a case where the AC power source (20) is a single-phase AC power source, the delay time in the delaying unit (502) is set to, for example, ½ of the power source period (Pin) of the AC power source (20).

In the description given above, the case is described as an example where the switching control unit (70) controls (compensates) the voltage in the inverter circuit (13) on the basis of the output of the indicator value processing unit (60) (specifically, the integral of the indicator value stored for each storage phase angle (θs) in the first storage processing unit (200)). Alternatively, the switching control unit (70) may be configured to control (compensate) the current in the inverter circuit (13) on the basis of the output of the indicator value processing unit (60). For example, the compensating unit (80) may be configured to compensate the current command value (idq*) derived by the multiplier (73) on the basis of the output of the indicator value processing unit (60) and output the compensated current command value to the current command generating unit (74). Alternatively, the switching control unit (70) may be configured to control (compensate) both the voltage and current in the inverter circuit (13) on the basis of the output of the indicator value processing unit (60). For example, the compensating unit (80) may be configured to perform an operation of compensating the current command value (idq*) derived by the multiplier (73) on the basis of the output of the indicator value processing unit (60) and outputting the compensated current command value to the current command generating unit (74), and an operation of compensating the voltage amplitude command value (r1*) derived by the command converting unit (77) on the basis of the output of the indicator value processing unit (60) and outputting the compensated voltage amplitude command value (r2*)

In addition, in the description given above, the case is described as an example where the number of storage phase angles (θs) predetermined in the storage period (Ps) is identical to the number of times an update operation is performed by the switching control unit (70) in the storage period (Ps). Alternatively, the number of storage phase angles (θs) predetermined in the storage period (Ps) need not necessarily be identical to the number of times an update operation is performed by the switching control unit (70) in the storage period (Ps). For example, the k storage phase angles (θs) predetermined in the storage period (Ps) may respectively correspond to k update operations among n (n is an integer greater than k) update operations performed by the switching control unit (70) in the storage period (Ps). The same applies to the k output phase angles (θo) predetermined in the output period.

In addition, in the description given above, the case is described as an example where the update period of the switching control unit (70) is set to a period that is 1/(6×k) of the power source period (Pin) of the AC power source (20) in a case where the AC power source (20) is a three-phase AC power source. Alternatively, the update period of the switching control unit (70) may or may not be set to an integral multiple of the period that is 1/(6×k) of the power source period (Pin) of the AC power source (20), which is a three-phase AC power source. Similarly, the case is described as an example where the update period of the switching control unit (70) is set to a period that is 1/(2×k) of the power source period (Pin) of the AC power source (20) in a case where the AC power source (20) is a single-phase AC power source. Alternatively, the update period of the switching control unit (70) may or may not be set to an integral multiple of the period that is 1/(2×k) of the power source period (Pin) of the AC power source (20), which is a single-phase AC power source.

In addition, in the description given above, the case is described as an example where the time intervals of the k storage phase angles (θs) predetermined in the storage period (Ps) are regular intervals. Alternatively, the time intervals of the k storage phase angles (θs) predetermined in the storage period (Ps) need not necessarily be regular intervals. The same applies to the k output phase angles (θo) predetermined in the output period.

In addition, in the description given above, the case is described as an example where the storage period (Ps) is set to a period shorter than the power source period (Pin) of the AC power source (20). Alternatively, the storage period (Ps) may be set to a period identical to the power source period (Pin) of the AC power source (20) or may be set to a period longer than the power source period (Pin) of the AC power source (20). The same applies to the output period.

In addition, the above embodiments may be carried out in an appropriate combination. The above embodiments are essentially preferable examples and do not intend to limit the scope of the present invention, the application thereof, or the use thereof.

As described above, the above-described power conversion device is useful as a power conversion device that converts power supplied from an AC power source into AC power having a predetermined frequency and voltage.

What is claimed is:

1. A power conversion device comprising:
    a power conversion unit that converts AC power output from an AC power source or DC power obtained by converting the AC power, into AC power having a predetermined frequency and voltage through a switching operation of a plurality of switching elements;
    a DC unit including a capacitor and a reactor, the capacitor smoothing a ripple caused by the switching operation in the power conversion unit; and
    a controller that controls the switching operation in the power conversion unit, the controller
        monitoring an indicator value correlated with a disturbance that distorts an input current supplied to the power conversion unit, and
        compensating a manipulated variable of control of the switching operation in the power conversion unit in accordance with at least a frequency component closest to a resonant frequency of the DC unit among a plurality of frequency components, and the plurality of frequency components being included in variations in the indicator value and corresponding to integral multiples of a power source frequency of the AC power source.

2. The power conversion device according to claim 1, wherein
    the controller includes
        a first storage processing unit that computes and stores, for each of a plurality of storage phase angles predetermined in a storage period that is based on a power source period of the AC power source, an integral of the indicator value at the storage phase angle, and
        a switching control unit
            that is configured to control the switching operation in the power conversion unit and
            that compensates the manipulated variable of control of the switching operation in the power conversion unit based on the integral of the indicator value stored for each of the storage phase angles in the first storage processing unit.

3. The power conversion device according to claim 2, wherein
    the first storage processing unit adds an indicator value acquired at the storage phase angle and a value acquired by multiplying the integral of the indicator value at the storage phase angle stored in the first storage processing unit by a positive coefficient stored in the first storage processing unit to a value acquired through the addition.

4. The power conversion device according to claim 1, wherein
    the controller includes an adding unit, a delaying unit, and a switching control unit,
    the adding unit adds the indicator value input thereto and an output of the delaying unit,
    the delaying unit delays an output of the adding unit by a delay time corresponding to an integral submultiple of a power source period of the AC power source, and
    the switching control unit
        is configured to control the switching operation in the power conversion unit and
        compensates the manipulated variable of control of the switching operation in the power conversion unit on the basis of the output of the adding unit.

5. The power conversion device according to claim 1, wherein
    the controller includes
        a frequency component extracting unit that extracts at least the frequency component closest to the resonant frequency of the DC unit among the plurality of frequency components, and the plurality of frequency components are included in the variations in the indicator value and correspond to the integral multiples of the power source frequency of the AC power source, and
        a switching control unit
            that is configured to control the switching operation in the power conversion unit and
            that compensates the manipulated variable of control of the switching operation in the power conversion unit based on the frequency component extracted by the frequency component extracting unit.

6. The power conversion device according to claim 1, wherein
    the controller includes
        a Fourier operation processing unit that performs Fourier transform on the indicator value to acquire an operation result about at least the frequency component closest to the resonant frequency of the DC unit among the plurality of frequency components, and the plurality of frequency components are included in the variations in the indicator value and correspond to the integral multiples of the power source frequency of the AC power source, and
        a switching control unit that is configured to control the switching operation in the power conversion unit and that compensates the manipulated variable of control of the switching operation in the power conversion unit based on the operation result acquired by the Fourier operation processing unit.

7. The power conversion device according to claim 2, wherein the switching control unit includes a compensation amount computing unit that derives a compensation amount that is based on at least the frequency component closest to the resonant frequency of the DC unit among the plurality of frequency components, and the plurality of frequency components are included in the variations in the indicator value and correspond to the integral multiples of the power source frequency of the AC power source, a multiplying unit that multiplies the compensation amount derived by the compensation amount computing unit by a predetermined multiplication coefficient, an adjusting unit that adjusts the multiplication coefficient for the multiplying unit such that an output of the multiplying unit is within a predetermined allowable range, and a compensation processing unit that compensates the manipulated variable of control of the switching operation in the power conversion unit based on the output of the multiplying unit.

8. The power conversion device according to claim 1, wherein the indicator value is any one of a reactor voltage across the reactor, a deviation between the reactor voltage and a command value of the reactor voltage, a deviation between the input current and a command value of the input current, a deviation between a DC voltage across the capacitor and a command value of the DC voltage, and a deviation between an energy of the capacitor and a command value of the energy of the capacitor.

9. The power conversion device according to claim 3, wherein the switching control unit includes a compensation amount computing unit that derives a compensation amount that is based on at least the frequency component closest to the resonant frequency of the DC unit among the plurality of frequency components, and the plurality of frequency components are included in the variations in the indicator value and correspond to the integral multiples of the power source frequency of the AC power source, a multiplying unit that multiplies the compensation amount derived by the compensation amount computing unit by a predetermined multiplication coefficient, an adjusting unit that adjusts the multiplication coefficient for the multiplying unit such that an output of the multiplying unit is within a predetermined allowable range, and a compensation processing unit that compensates the manipulated variable of control of the switching operation in the power conversion unit based on the output of the multiplying unit.

10. The power conversion device according to claim 4, wherein the switching control unit includes a compensation amount computing unit that derives a compensation amount that is based on at least the frequency component closest to the resonant frequency of the DC unit among the plurality of frequency components, and the plurality of frequency components are included in the variations in the indicator value and correspond to the integral multiples of the power source frequency of the AC power source, a multiplying unit that multiplies the compensation amount derived by the compensation amount computing unit by a predetermined multiplication coefficient, an adjusting unit that adjusts the multiplication coefficient for the multiplying unit such that an output of the multiplying unit is within a predetermined allowable range, and a compensation processing unit that compensates the manipulated variable of control of the switching operation in the power conversion unit based on the output of the multiplying unit.

11. The power conversion device according to claim 5, wherein the switching control unit includes a compensation amount computing unit that derives a compensation amount that is based on at least the frequency component closest to the resonant frequency of the DC unit among the plurality of frequency components, and the plurality of frequency components are included in the variations in the indicator value and correspond to the integral multiples of the power source frequency of the AC power source, a multiplying unit that multiplies the compensation amount derived by the compensation amount computing unit by a predetermined multiplication coefficient, an adjusting unit that adjusts the multiplication coefficient for the multiplying unit such that an output of the multiplying unit is within a predetermined allowable range, and a compensation processing unit that compensates the manipulated variable of control of the switching operation in the power conversion unit based on the output of the multiplying unit.

12. The power conversion device according to claim 6, wherein the switching control unit includes a compensation amount computing unit that derives a compensation amount that is based on at least the frequency component closest to the resonant frequency of the DC unit among the plurality of frequency components, and the plurality of frequency components are included in the variations in the indicator value and correspond to the integral multiples of the power source frequency of the AC power source, a multiplying unit that multiplies the compensation amount derived by the compensation amount computing unit by a predetermined multiplication coefficient, an adjusting unit that adjusts the multiplication coefficient for the multiplying unit such that an output of the multiplying unit is within a predetermined allowable range, and a compensation processing unit that compensates the manipulated variable of control of the switching operation in the power conversion unit based on the output of the multiplying unit.

13. The power conversion device according to claim 2, wherein the indicator value is any one of a reactor voltage across the reactor, a deviation between the reactor voltage and a command value of the reactor voltage, a deviation between the input current and a command value of the input current, a deviation between a DC voltage across the capacitor and a command value of the DC voltage, and a deviation between an energy of the capacitor and a command value of the energy of the capacitor.

14. The power conversion device according to claim 3, wherein the indicator value is any one of a reactor voltage across the reactor, a deviation between the reactor voltage and a command value of the reactor voltage, a deviation between the input current and a command value of the input current, a deviation between a DC voltage across the capacitor and a command value of the DC voltage, and a deviation between an energy of the capacitor and a command value of the energy of the capacitor.

15. The power conversion device according to claim 4, wherein the indicator value is any one of a reactor voltage across the reactor, a deviation between the reactor voltage and a command value of the reactor voltage, a deviation between the input current and a command value of the input current, a deviation between a DC voltage across the capacitor and a command value of the DC voltage, and a deviation between an energy of the capacitor and a command value of the energy of the capacitor.

16. The power conversion device according to claim 5, wherein the indicator value is any one of a reactor voltage across the reactor, a deviation between the reactor voltage and a command value of the reactor voltage, a deviation between the input current and a command value of the input current, a deviation between a DC voltage across the capacitor and a command value of the DC voltage, and a deviation between an energy of the capacitor and a command value of the energy of the capacitor.

17. The power conversion device according to claim 6, wherein the indicator value is any one of a reactor voltage across the reactor, a deviation between the reactor voltage and a command value of the reactor voltage, a deviation between the input current and a command value of the input current, a deviation between a DC voltage across the capacitor and a command value of the DC voltage, and a deviation between an energy of the capacitor and a command value of the energy of the capacitor.

18. The power conversion device according to claim 7, wherein the indicator value is any one of a reactor voltage across the reactor, a deviation between the reactor voltage and a command value of the reactor voltage, a deviation between the input current and a command value of the input current, a deviation between a DC voltage across the capacitor and a command value of the DC voltage, and a deviation between an energy of the capacitor and a command value of the energy of the capacitor.

\* \* \* \* \*